United States Patent

[11] 3,566,877

[72] Inventors Luther B. Smith;
Frank A. Yarger, Miami Beach, Fla.

[21] Appl. No. 696,039
[22] Filed Jan. 5, 1968
[45] Patented Mar. 2, 1971

[54] ELECTROTHERAPEUTIC APPARATUS AND TREATMENT HEAD AND METHOD FOR TUNING SAID TREATMENT HEAD
49 Claims, 40 Drawing Figs.

[52] U.S. Cl. .......... 128/422, 128/404
[51] Int. Cl. .......... A61n 1/40
[50] Field of Search .......... 128/404, 405, 413, 417, 418, 419, 422; 317/249

[56] References Cited

UNITED STATES PATENTS

| | | | |
|---|---|---|---|
| 990,158 | 4/1911 | Moses | 128/417 |
| 2,103,440 | 12/1937 | Weissenberg | 128/413X |
| 2,223,447 | 12/1940 | Hathaway | 128/422 |
| 2,656,839 | 10/1953 | Howard | 128/422 |
| 2,774,068 | 12/1956 | Haagensen | 128/404X |
| 2,882,904 | 4/1959 | Rasmussen | 128/418 |
| 3,127,895 | 4/1964 | Kendall et al. | 128/422 |
| 3,368,565 | 2/1968 | Kendall et al. | 128/404 |

*Primary Examiner*—William E. Kamm
*Attorney*—Cushman, Darby and Cushman

ABSTRACT: An electrotherapeutic apparatus is disclosed wherein diamond-shaped pulses of electromagnetic energy are produced by a pulse generator and applied to a treatment head which radiates the pulsed energy to a given load. A power amplification output stage of the pulse generator includes a tunable tank circuit. A detector is provided to determine whether the tank circuit is in its resonant state, the detector being transformer coupled to the tank circuit whereby the minimum current flowing through the detector corresponds to the resonant state of the tank circuit. Connected in series with the detector is a resistor network which permits the detector reading to be on-scale for each amplitude adjustment of the diamond-shaped pulses. Included within the treatment head is a further tunable tank circuit which comprises a tunable capacitor and an inductor, several embodiments of which are disclosed. The pulsed energy from pulse generator is transformer coupled to the tunable tank circuit of the treatment head, the primary winding of the treatment head transformer also being disclosed in several embodiments. Methods for tuning the electrotherapeutic apparatus with an artificial load which simulates a patient or the like and for establishing the artificial load are also disclosed.

INVENTORS
LUTHER B. SMITH
FRANK A. YARGER

BY Cushman, Darby & Cushman
ATTORNEYS

INVENTORS
LUTHER B. SMITH
BY FRANK A. YARGER
Cushman, Darby & Cushman
ATTORNEYS

INVENTORS
LUTHER B. SMITH
FRANK A. YARGER
By
Cushman, Darby & Cushman
ATTORNEYS

INVENTORS
LUTHER B. SMITH
FRANK A. YARGER

BY Cushman, Darby & Cushman
ATTORNEYS

INVENTORS
LUTHER B. SMITH
FRANK A. YARGER

BY Cushman, Darby & Cushman
ATTORNEYS

INVENTORS

LUTHER B. SMITH
FRANK A. YARGER

BY Cushman, Darby & Cushman
ATTORNEYS

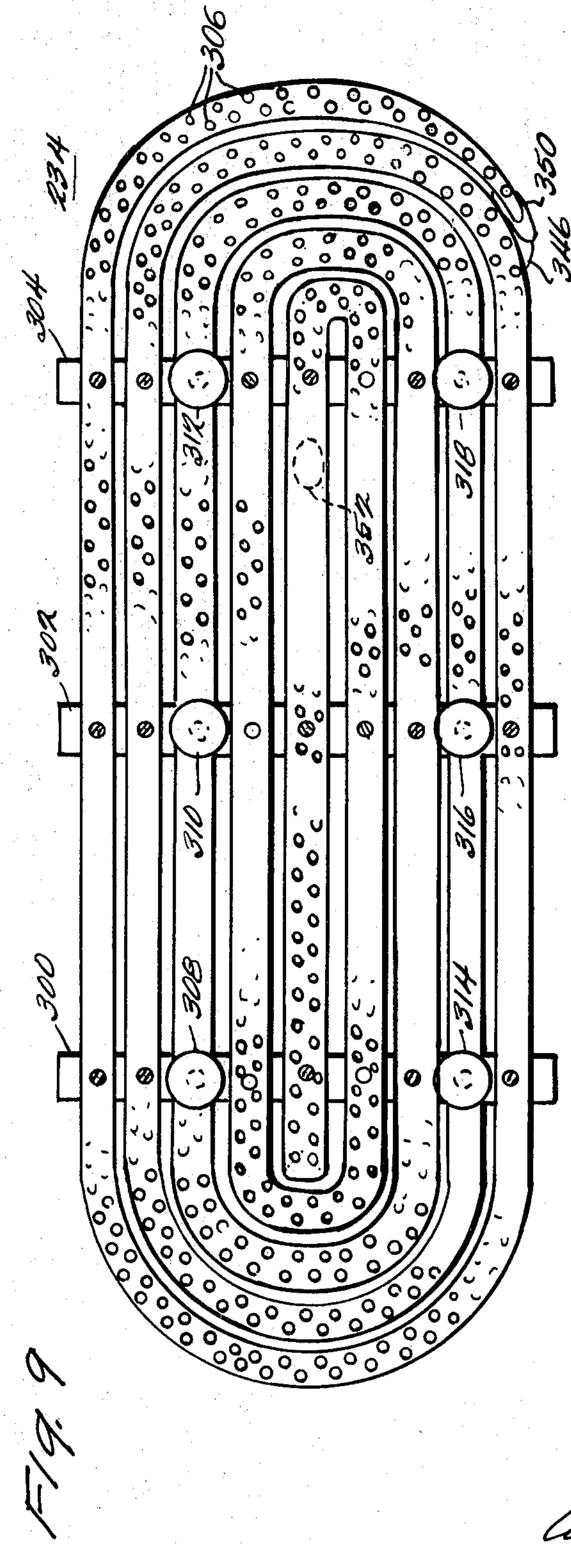
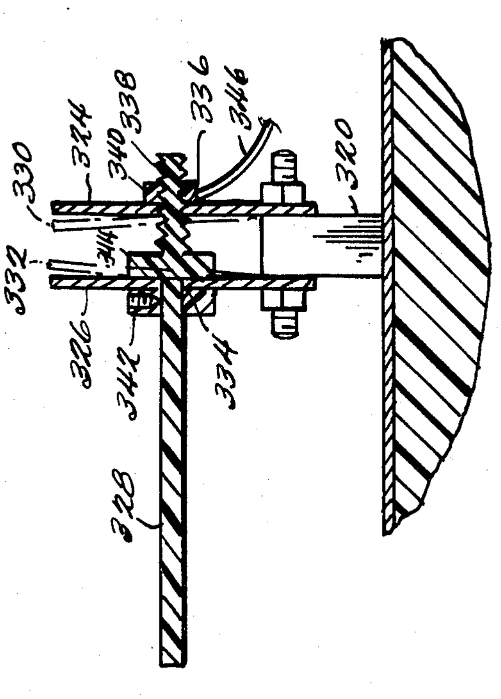
FIG. 10
INVENTORS
LUTHER B. SMITH
FRANK A. YARGER
BY Cushman, Darby & Cushman
ATTORNEYS

INVENTORS
LUTHER B. SMITH
FRANK A YARGER

BY Cushman, Darby & Cushman
ATTORNEYS

INVENTORS
LUTHER B. SMITH
FRANK A. YARGER

BY Cushman, Darby & Cushman
ATTORNEYS

INVENTOR
LUTHER B. SMITH
FRANK A. YARGER

BY Cushman, Darby & Cushman
ATTORNEYS

INVENTORS
LUTHER B. SMITH
FRANK A. YARGER

BY
Cushman, Darby & Cushman
ATTORNEYS

INVENTORS
LUTHER B. SMITH
FRANK A. YARGER

BY Cushman, Darby & Cushman
ATTORNEYS

INVENTORS
LUTHER B SMITH
FRANK A. YARGER
BY
Cushman, Darby & Cushman
ATTORNEYS

INVENTORS
LUTHER B. SMITH
FRANK A. YARGER

BY
Cushman, Darby & Cushman
ATTORNEYS

PATENTED MAR 2 1971

3,566,877

SHEET 15 OF 19

INVENTOR
LUTHER B. SMITH
FRANK A YARGER

BY Cushman, Darby & Cushman
ATTORNEYS

INVENTOR
LUTHER B. SMITH
FRANK A. YARGER
BY Cushman, Darby & Cushman
ATTORNEYS

INVENTORS
LUTHER B. SMITH
FRANK A. YARGER

BY
Cushman, Darby & Cushman
ATTORNEYS

INVENTORS
LUTHER B. SMITH
FRANK A. YARGER

BY Cushman, Darby & Cushman
ATTORNEYS

INVENTORS
LUTHER B. SMITH
FRANK A YARGER
BY Cushman, Darby & Cushman
ATTORNEYS

ELECTROTHERAPEUTIC APPARATUS AND TREATMENT HEAD AND METHOD FOR TUNING SAID TREATMENT HEAD

CROSS-REFERENCES TO RELATED APPLICATIONS

U.S. Ser. No. 600,341, filed Nov. 17, 1966, by Luther B. Smith, and Ser. No. 634,354, filed Apr. 27, 1967, by Frank A. Yarger, now U.S. Pat. No. 3,503,403 granted Mar. 31, 1970 both contain some subject matter common with the instant application.

BACKGROUND OF THE INVENTION

This invention relates to electrotherapeutic apparatus and, in particular, to improved electrotherapeutic apparatus for producing diamond-shaped pulses of electromagnetic energy. The invention also relates to an improved method for tuning the apparatus and for establishing an artificial load suitable for tuning the apparatus.

The electrotherapeutic apparatus of the prior art typically has been tuned by either adjusting a tunable tank circuit in the treatment head or a tunable tank circuit in the power amplification stage of the pulse generator. However, both of the above arrangements have proven unsatisfactory because for maximum power transfer from the pulse generator to the treatment head an impedance match is required between all of the following elements: (1) the power amplifier tunable tank circuit; (2) the coaxial cable connecting the pulse generator to the treatment head; (3) the tunable tank circuit of the treatment head; and (4) the load to which the treatment head radiates the pulsed energy. With the attainment of this condition, not only is there maximum transfer of power thereby maximizing the effectiveness of the apparatus, but also power losses are minimized (as would be expected), thereby minimizing the tendency of the apparatus to overheat and cause discomfort to the operator or patient.

In establishing the initial tuned condition of the apparatus, it is desirable to employ an artificial, patient-simulating load to which the apparatus can be impedance matched. It is typical of the prior art approach to tune the apparatus by placing a light bulb connected to a loop of wire adjacent the treatment head and performing a tuning operation until the glow of the light bulb is at its brightest. The shortcomings of this approach are two: (1) It is extremely difficult for the human to determine exactly when the light bulb is at its brightest and (2) the impedance of the light bulb has no known correspondence to the impedance which a portion of the human body would present to a radiating treatment head. Thus, the desirability of an artificial, patient-simulating load is apparent together with measuring means inherently more accurate than a light bulb. Further, such a load is desirable inasmuch as it is not necessary to employ a human being during the tuning operation at the manufacturing facility. Longevity tests can be performed on the apparatus prior to the shipment thereof to the customer.

SUMMARY

It is an object of this invention to provide an improved electrotherapeutic apparatus for generating diamond-shaped pulses of electromagnetic energy.

It is a further object of this invention to provide an electrotherapeutic apparatus including tunable tank circuits in both the pulse generator and treatment head for facilitating accurate tuning of the apparatus.

It is a further object of this invention to provide an improved method for tuning electrotherapeutic apparatus.

It is a further object of this invention to provide an improved method for establishing an artificial load for utilization in the above-mentioned, improved tuning method of this invention.

It is a further object of this invention to provide improved primary and secondary coils for use in treatment heads employed in this invention.

BRIEF DESCRIPTION OF THE DRAWING

FIG. 9 is a plan view of an illustrative embodiment of the secondary coil of the treatment head of FIG. 4.

FIG. 10 is a cross-sectional view taken along the line 10–10 of FIG. 7.

DETAILED DESCRIPTION OF THE PREFERRED EMBODIMENTS

Figure 1:
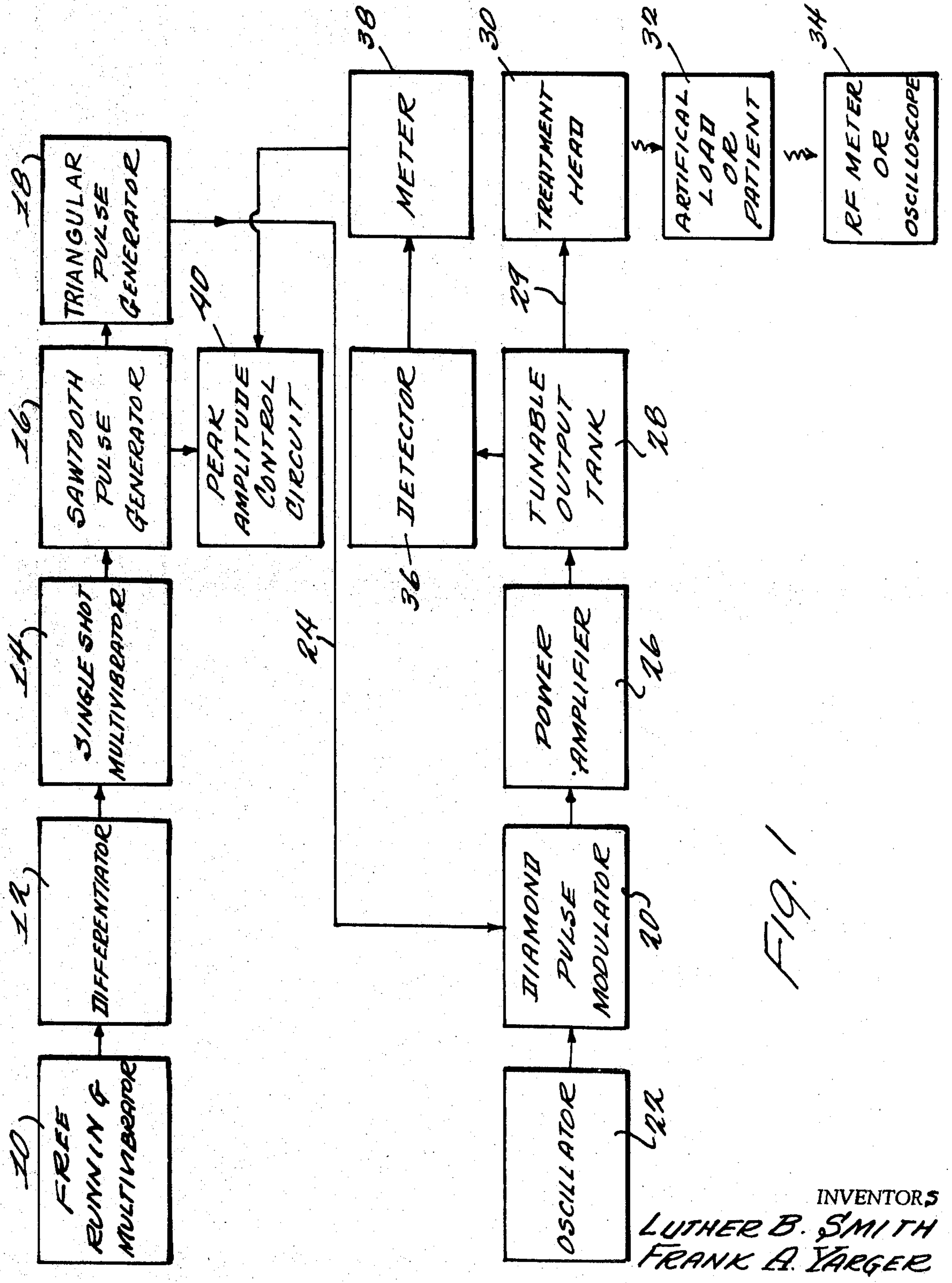
FIG. 1 is a block diagram of an illustrative embodiment of the invention.
Figure 3A:
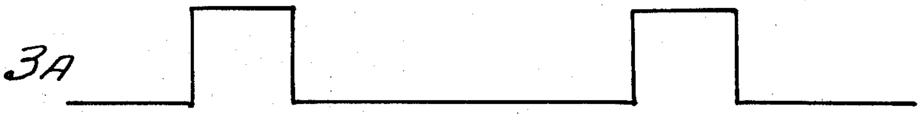
FIGS. 3A—3G depict various waveforms which occur in the FIG. 1 embodiment.

Referring to the several views of the drawing where like reference numerals refer to the same parts of the invention and, in particular to FIG. 1, there is shown an overall block diagram of a preferred embodiment of the invention. The free-running or astable multivibrator 10 produces a pulse train (see FIG. 3A), the repetition rate of which may be varied—in steps of 250, 500, 1,250, 2,500, 5,000 and 10,000 pulses per second.

Because of the inherent pulse width instability of the output of free-running multivibrator 10 when the frequency is changed, a differentiator 12 differentiates the pulse train produced by multivibrator 10, the spikes (see FIG. 3B) resulting from the differentiation, in turn, being applied to a single shot multivibrator 14 which produces pulses (see FIG. 3C) of constant width regardless of the above-mentioned instability of the multivibrator 10. The width of these pulses can be fixed and in this embodiment is chosen to be 50 microseconds.

The output pulses from single shot 14 are applied to sawtooth pulse generator 16 which produces sawtooth pulses (see FIG. 3D) in response to the single shot pulses, the width of the sawtooth pulses being equal to the width of the single shot pulses. The sawtooth pulses are applied to diamond pulse generator 18 which produces triangular pulses (see FIG. 3E) in response to the sawtooth pulses. The triangular pulses are applied to diamond pulse modulator 20 to amplitude modulate the output of oscillator 22 (see FIG. 3F) which is also applied to modulator 20, the modulated output being shown in FIG. 3G and having a diamond shape as can readily be seen.

The diamond pulse modulated signal is applied to a tunable output tank circuit 28 which is typically tuned to 27.12 mc. or any other suitable operating frequency. However, the tuning is adjustable in order that proper matching to the simulated patient load may be effectuated at the manufacturing plant prior to use of the electrotherapeutic apparatus by a patient or doctor. The output tank 28 is connected to treatment head 30 by coaxial cable or other suitable connecting means 29. The treatment head radiates diamond-shaped pulses of electromagnetic energy to a load 32 which may be either the patient simulating load or else the patient. For testing purposes which will be described in more detail hereinafter, an RF meter or an oscilloscope 34 may be employed to detect the energy which radiates through load 32 when this load is used for patient simulation.

As stated above, one of the more important aspects of this invention is to provide an electrotherapeutic apparatus which is tuned to a patient as opposed to some unreliable and artificial load such as a light bulb. To effectuate this tuning, detector 36 is transformer coupled to tank 28, the detector output being applied to meter 38 which senses the tuned condition of the tank. Peak amplitude control circuit 40 is responsive to the magnitude of the sawtooth pulse (which may be manually controlled, as will be brought out in more detail hereinafter) generated by generator 16 to regulate the amount of current flowing through meter 38, as will be described in more detail below.

Figure 2A:
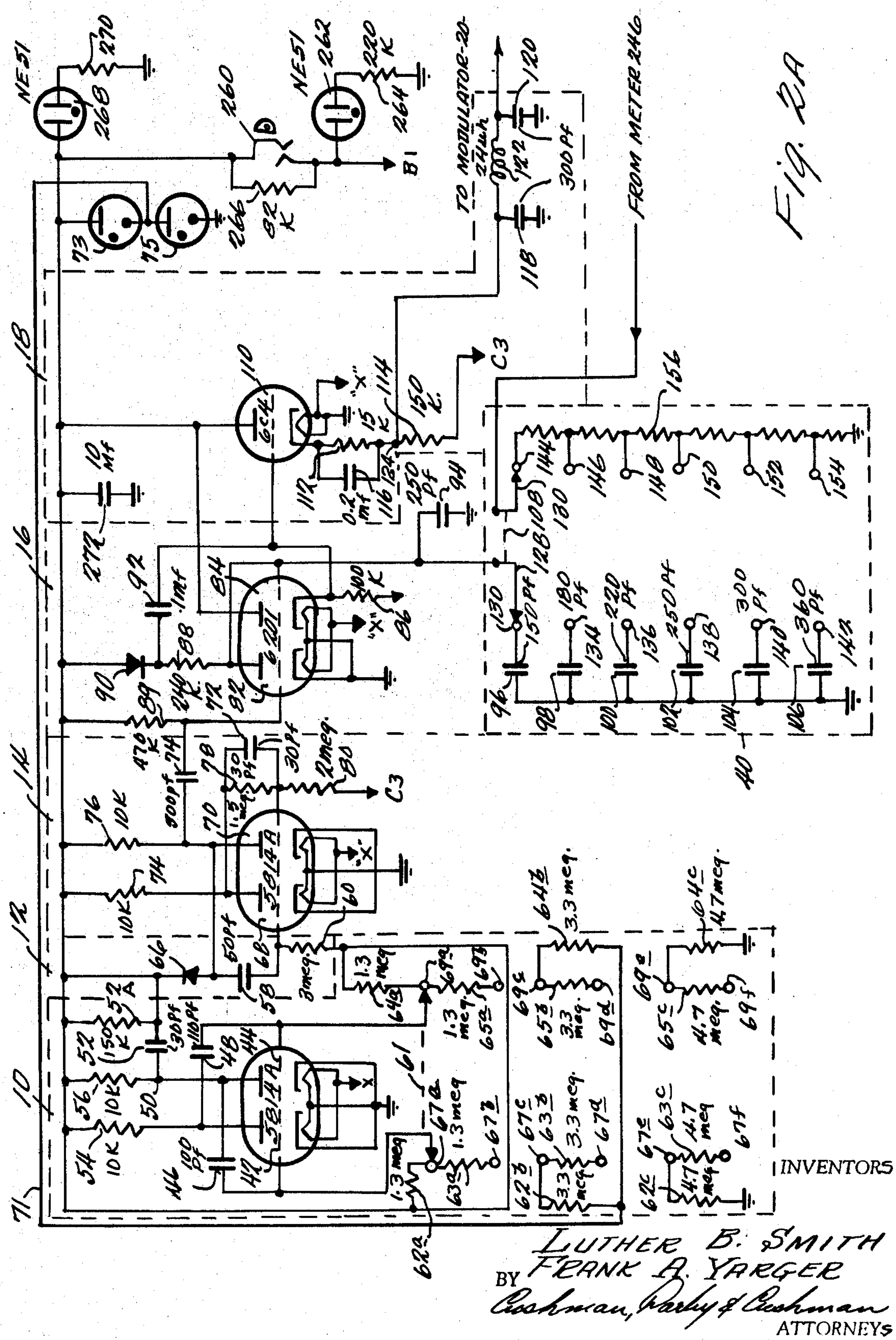
FIGS. 2A and 2B are a schematic diagram of the embodiment of FIG. 1.
Figure 2B:
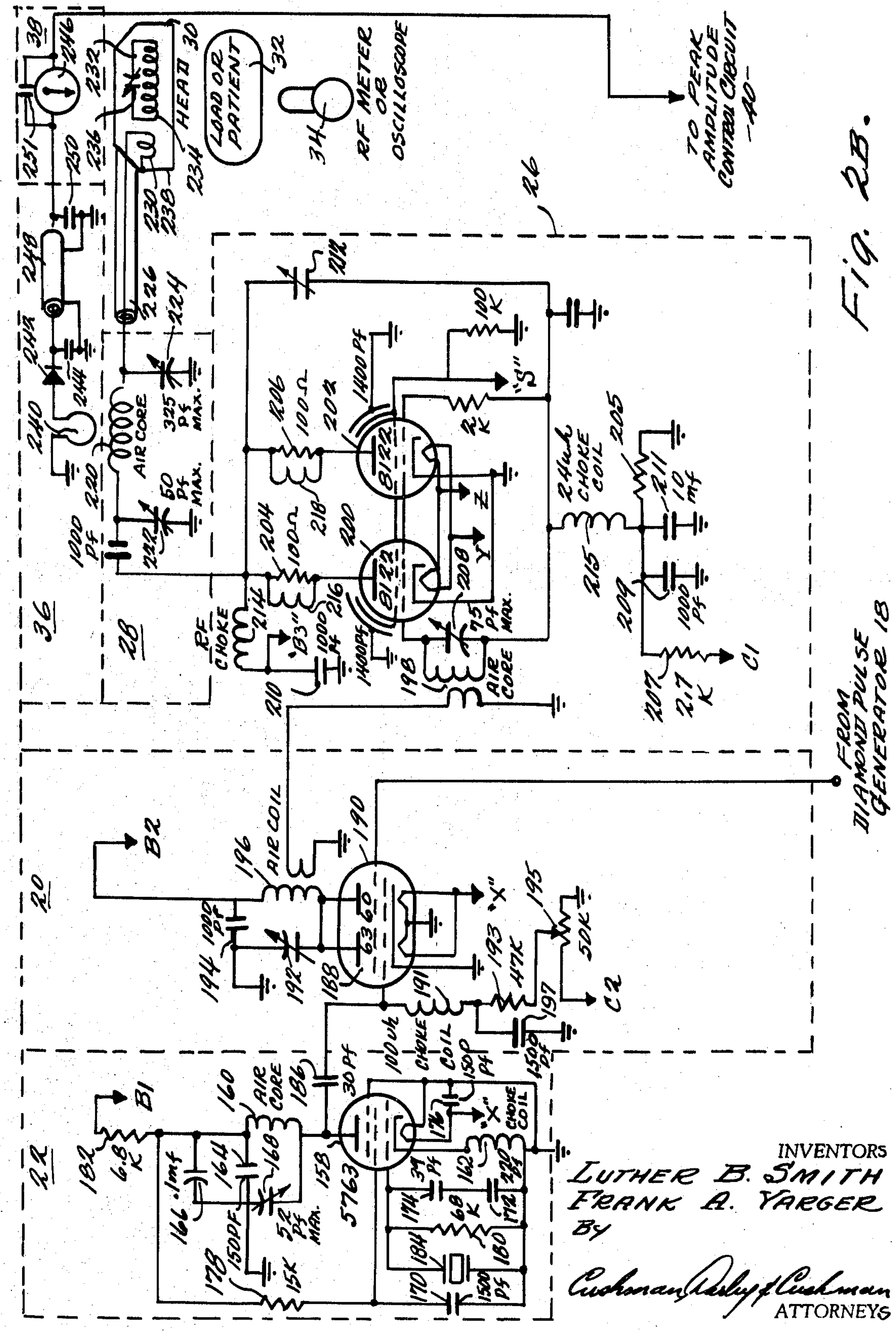

Referring to FIGS. 2A and 2B, both of which taken together are a schematic diagram of the block diagram of FIG. 1, the blocks of the block diagram being indicated by the dotted line portions of the circuit diagram. The free-running multivibrator 10 employs tubes 42 and 44 in a conventional manner together with feedback capacitors 46 and 48 and resistors 54 and 56. The pulse rate is adjustable and controlled by a six-position switch 61, the six positions indicated at terminals 67*a*—67*f* and 69*a*—69*f*. At the position shown, the pulse rate is 10,000 pulses per second. As the switch is moved downwardly to terminals 67*b* and 69*b*, the pulse rate is decreased to 5,000 pulses per second. At the lowest pair of terminals, 67*f* and 69*f*, the pulse rate is 250 pulses per second, the voltage for terminals pairs 67*c*, 69*c* and 67*d*, 69*d* is derived over line 71 from a voltage divider comprising gas tubes 73 and 75.

Figure 3B:
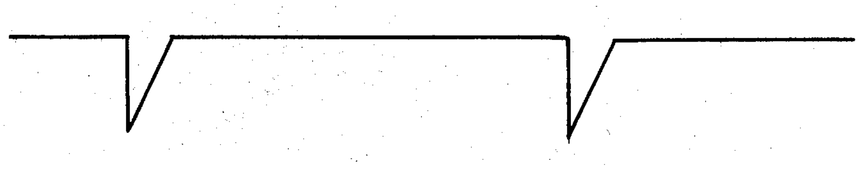
Figure 3C:
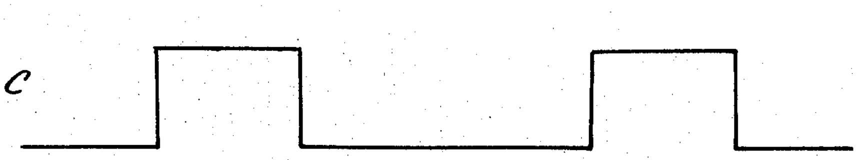
Figure 3D:
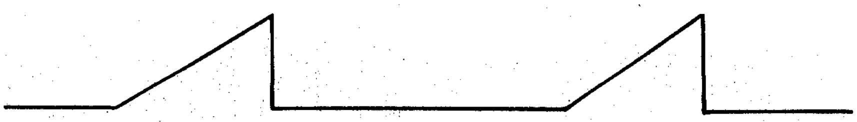
Figure 3E:
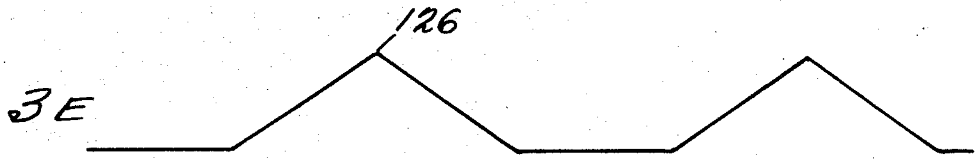
Figure 3F:
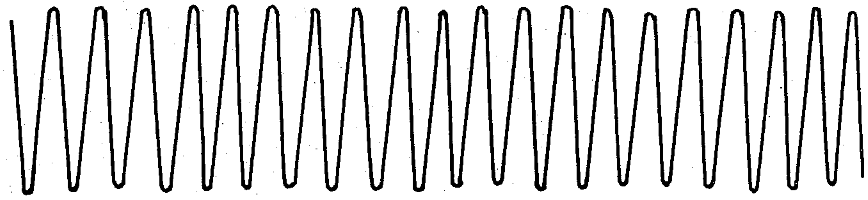
Figure 3G:
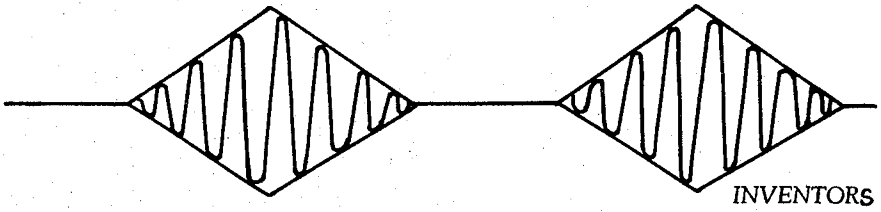

The pulses are developed at terminal 50 and applied through coupling capacitor 52 to differentiator 12 which comprises capacitor 52 and resistor 52A. The diode 66 is so polarized as to permit only the generation of negative spikes as shown in FIG. 3B.

The output of differentiator 12 is applied to single shot 14 which is of conventional design and which comprises tubes 68 and 70, capacitors 72 and 58, and resistors 60 and 74—80. The width of the pulses produced by single shot 14 is accurately maintained and thus any pulse width instability of multivibrator 10 is minimized. The output of single shot 14 (see FIG. 4C) is applied to bootstrap sawtooth pulse generator 16 through coupling capacitor 74. The sawtooth pulse generator includes tubes 82 and 84, resistors 86, 88 and 89, diode 90, capacitors 92—106 and six-way switch 108. The rise time of the sawtooth signal is controlled by resistor 88 together with capacitor 94 and capacitor 96 when switch 108 is in the position shown in FIG. 2A. The purpose of the bank of capacitors 96—106 is to provide a variable regulation as to the peak amplitude of the sawtooth pulses and thus this bank of capacitors corresponds to the peak amplitude control block 40 shown in FIG. 1. The width of the sawtooth waveform always remains the same as the width of the single shot output signal. The switch 108 has two armatures 128 and 130 which are ganged together. The armature 128 can be connected to the six terminals 132—142 while the armature 130 can be respectively connected to the six taps 144—154 of potentiometer 156. Since armatures 128 and 130 are ganged together, the movement of armature 130 along the potentiometer taps 144—154 occurs simultaneously with the movement of armature 128 along the terminals 132—142. The purpose of this feature will be discussed in more detail hereinafter.

The sawtooth pulses are applied to the diamond pulse generator 18 which includes a cathode follower, the cathode circuit of which includes tube 110, resistors 112 and 114, bypass capacitor 116, integrating capacitors 118 and 120, and radio frequency choke 122. The trailing edge of the sawtooth pulse is integrated by resistors 112 and 114 and capacitors 118 and 120 as can be seen from a comparison of FIGS. 3D and 3E. Preferably, the slope of the leading edge of the sawtooth pulse equals the negative of the slope of the trailing edge, both of these slopes having a constant value. Further, it is preferable that the portion 126 of the diamond-shaped pulse be a substantially sharp point. The terminal 124 should be maintained at a slightly negative voltage (for example, −4 volts) to prevent modulation of the radio frequency signal during the off time of the modulating diamond pulses. If the off time level assumes a positive value with respect to ground, it will result in overheating of the treated area. Preferably, this slight negative voltage is maintained at terminal 124 by returning resistor 114 to a negative voltage (C3) at the power supply and causing the ratio of the values of the resistors 112 and 114 to be approximately ten to one, where resistor 114 has the largest value.

As indicated in FIG. 2A, the triangular pulse is applied to modulator 20 of FIG. 2B. Also applied to modulator 20 is the output from oscillator 22 (see FIG. 2B) which includes tube 158, inductors 160 and 162, capacitors 164—176, resistors 178, 180 and 182, and crystal 184. Crystal frequency is doubled by the tank which includes inductor 160 and capacitors 164, 166 and 168, and the oscillator signal is applied to modulator 20 via coupling capacitor 186. The modulator includes tubes 188 and 190, which are connected for parallel operation. The screen electrodes of these tubes are connected to the diamond pulse generator 18 of FIG. 2A, as indicated in FIG. 2B. The modulator 20 causes amplitude modulation of the oscillator output by the triangular pulse produced by generator 18, as stated hereinbefore. The modulator 20 includes inductor 191, resistor 193, potentiometer 195, capacitor 197, and an output tank circuit comprising capacitors 192 and 194 and transformer 196. The modulator output is coupled to the power amplifier 26 by transformer 198. Power amplifier 198 includes a pair of ceramic amplifier tubes 200 and 202, which are preferred because of the resistance of these tubes to overheating. These tubes are connected in parallel to provide the required amount of output power. The power amplifier also includes resistors 204, 205, 206, and 207, capacitors 208, 209, 210, 211 and 212, and inductors 214, 215, 216 and 218.

The power amplifier output signal is applied to tunable tank circuit 28 which includes inductor 220, tube loading capacitor 222 and output loading 224. The tank circuit output signal is connected over coaxial cable 226 to the treatment head 30 which includes a primary winding 230 and a tank circuit 232 comprised of secondary winding 234 and tuning capacitor 236. The coupling between primary winding 230 and secondary winding 234 is transformer coupling.

As will be brought out in more detail hereinafter, the secondary winding is positioned adjacent the face 238 of the treatment head. Further, as indicated in FIG. 2B, the face 238 is placed next to the load 32 which may be a patient or a patient simulating load. The RF meter or oscillator 34 is also shown in FIG. 2B.

In order to indicate that the electrotherapeutic apparatus is tuned to the patient or the artificial load, a pickup loop 240 is positioned with respect to inductor 220 of tank 28. The output of the loop is applied to rectifier 242 and filter capacitor 244. The rectified signal is applied to meter 246 via cable 248 and low frequency filter capacitor 250. The cable is optional and is used whenever the tank 28 cannot be positioned near the meter 246 which must be placed on the front panel (not shown) of the equipment. Capacitor 251 acts as a shunt to radio frequencies. The meter 246, when nulled, indicates the tuned condition of the electrotherapeutic apparatus and the operation thereof will be explained in more detail hereinafter. Preferably, the meter is mounted upside down or has a reversed spring for reading in reverse so as to give an apparent up scale reading when the treatment head is properly tuned and a down scale reading when the treatment head is mistuned.

As indicated in FIG. 2B, the meter 246 is connected to the peak amplitude control circuit 40 and, in particular, to the potentiometer or resistor bank 156. The reason for this potentiometer is to maintain a center scale reading on meter 33 at any setting of the bank of capacitors 132—142. Thus, as the peak amplitude of the diamond pulse signal is increased or decreased, a higher or lower, respectively, value of resistance is switched in series with the meter 246, thereby maintaining the center scale reading on the meter.

Figure 26A:
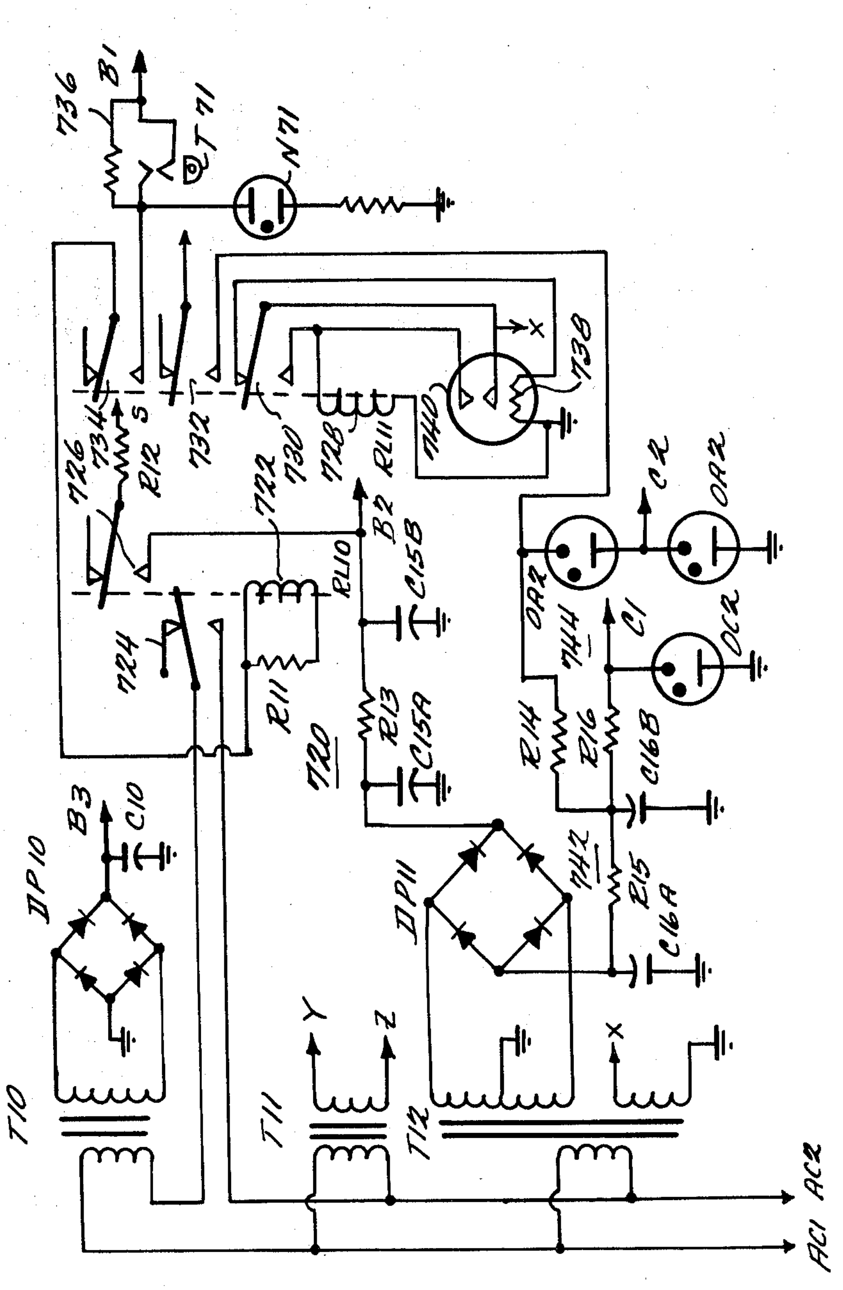
FIG. 26A is a schematic diagram of an illustrative power supply for use with the invention.

The power supply which provides the necessary operating voltages is shown in FIG. 26A and has been described in copending application U.S. Ser. No. 634,354 filed Apr. 27, 1964, by Frank A. Yarger and entitled "Improved Power Supply." Typical values of the operating voltages are: B1 (+300 v.), B2 (+400 v.), B3 (+2,200 v.), C1 (−75 v.), C2 (−150 v.), S (360 v.), X (6.3 v. AC Y to Z (13.5 v. AC), the letters corresponding to these operating voltages being shown in FIGS. 2A and 2B. It is to be understood that these values are given for illustrative purposes only and are not intended to be limitative. This same statement applies to the illustrative values of the components shown in FIGS. 2A and 2B, which have been employed in a preferred embodiment of the invention.

Referring to FIG. 2A, there is diagrammatically shown a timer 260, which determines the amount of time the patient is treated by the electrotherapeutic apparatus. Neon light 268 provides an indication of when the timer 260 is actuated and neon light 262 provides an indication of when the warm-up period is over as described in more detail in the above-mentioned copending U.S. application Ser. No. 634,354. Thus, the detailed description of the diamond pulse generating circuitry has been completed.

Figure 4:
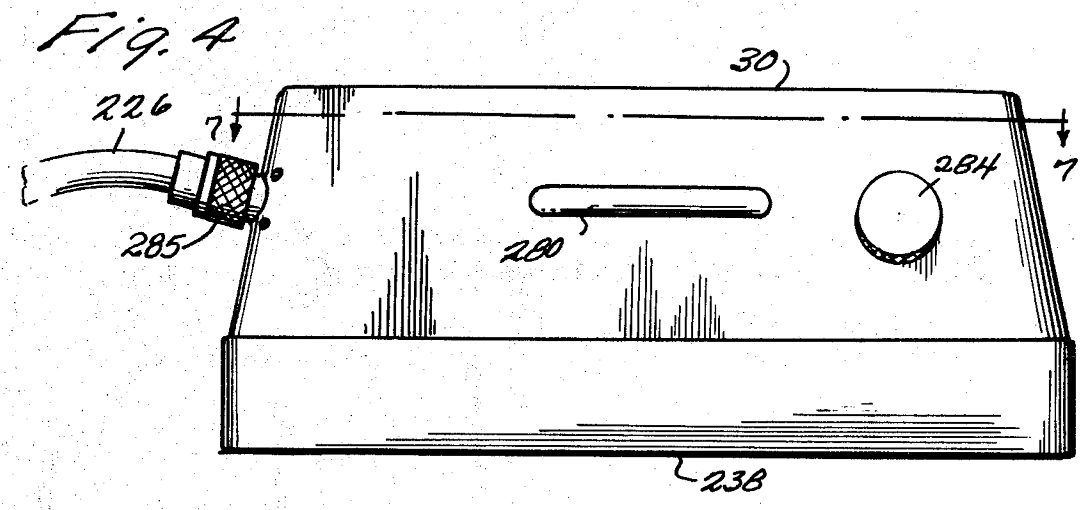
FIG. 4 is a side elevational view of an illustrative embodiment of a treatment head.
Figures 5, 6:
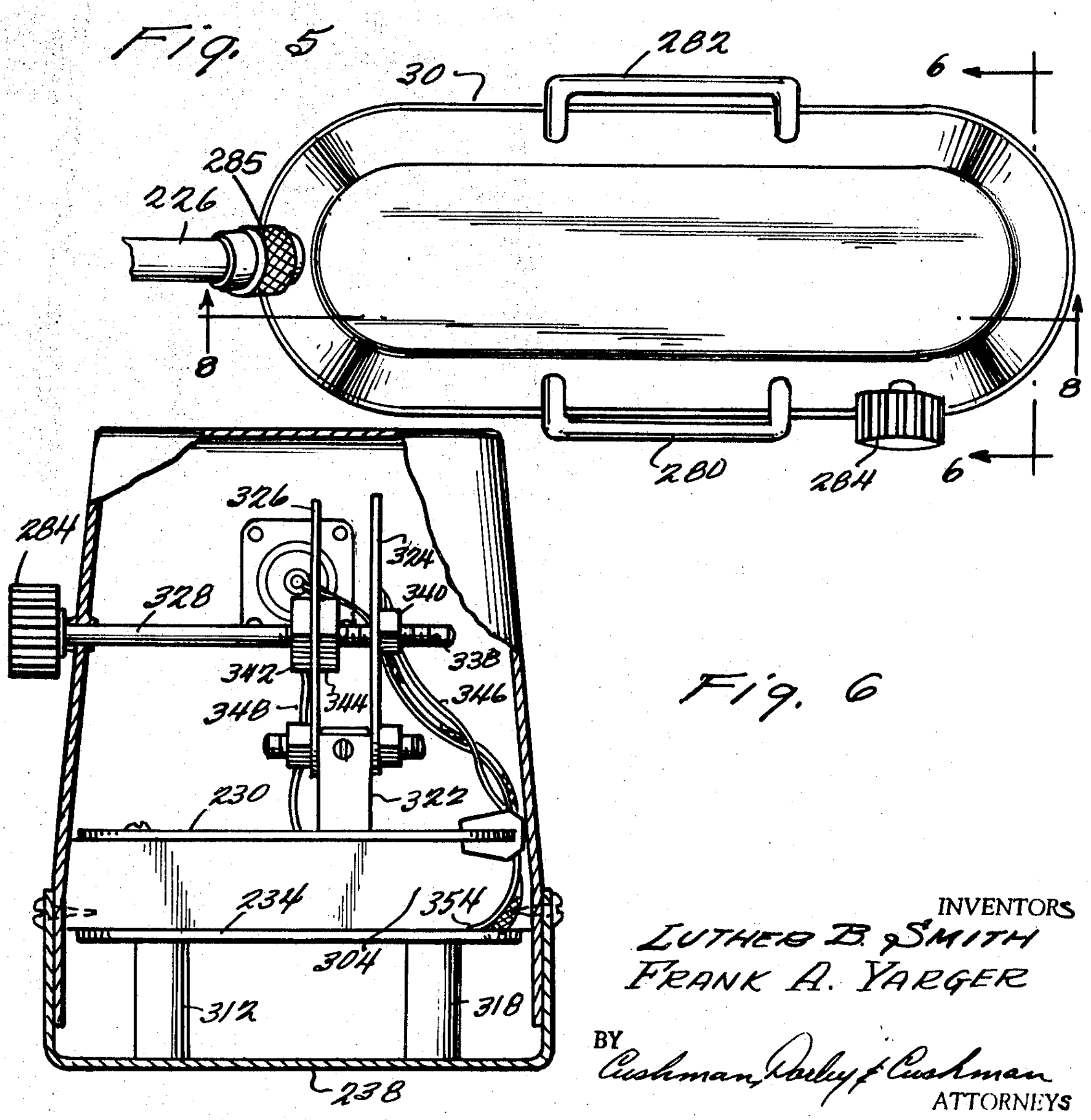
FIG. 5 is a bottom plan view of the FIG. 4 treatment head.
FIG. 6 is a fragmentary, cross-sectional view of the FIG. 4 treatment head taken along the line 6–6 of FIG. 5.

Before proceeding with a description of the operation thereof, a detailed description of a preferred embodiment of the treatment head for use with the diamond pulse generator will now be given. Referring to FIG. 2B, the treatment head 30 is diagrammatically indicated as having a primary coil 230 and a tunable secondary tank 232 comprising secondary winding 234 and adjustable capacitor 236. Referring to FIGS. 4 and 5, there are respectively shown a side view and a top plan view of the treatment head 30. In FIG. 4 there is shown the cable 226, the surface or cover 238, which is disposed adjacent the load 32, as described hereinbefore. The head also includes one or more handles 280 and 282 and a tuning knob 284 for adjusting variable capacitor 236 (see FIG. 2B). Also, a connector 285 is shown for connecting cable 226 to the primary coil 230.

Figures 7, 8:
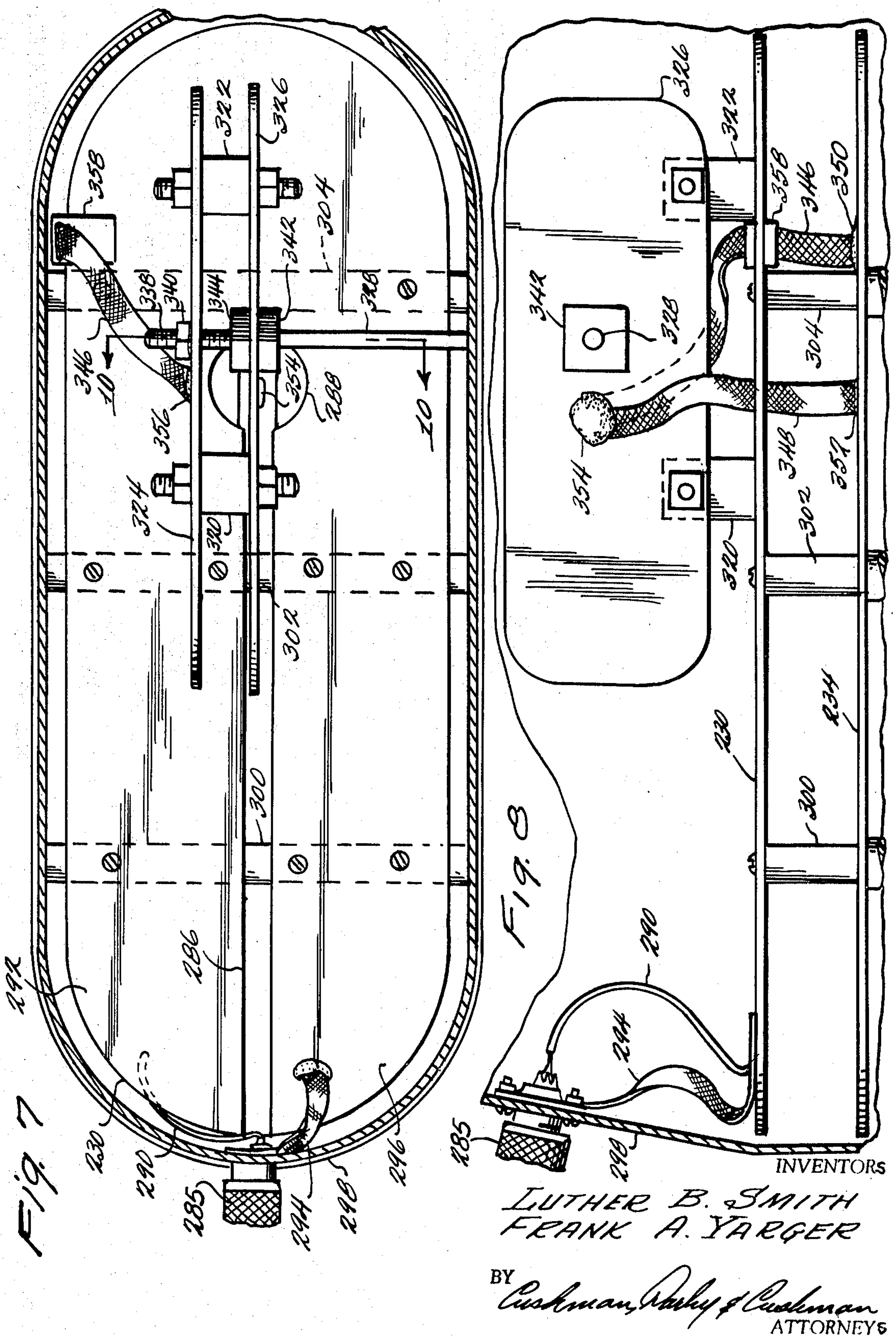
FIG. 7 is a cross-sectional view taken along line 7–7 of FIG. 4.
FIG. 8 is a cross-sectional view taken along line 8–8 of FIG. 5.

Referring now to FIGS. 6, 7 and 8, there are shown fragmentary cross-sectional views of the treatment head 30 taken on lines 6–6, 7–7, and 8–8, respectively, of FIGS. 4 and 5. As seen in FIG. 7, the primary winding 230 of FIG. 2B preferably consists of a single loop of metal formed from a sheet of metal wherein an elongate slot 286 extends from the periphery of the metal sheet to a circular aperture 288 disposed within the periphery of the sheet. The purpose of the aperture will be described hereinafter. The shape of the slot 286 and the aperture 288 are optional. The primary coil 230 is made of copper and is typically 0.021 inch thick. Of particular importance is a silver plating disposed on both sides of the primary coil — that is, on the side of the coil away from the cover 238 of the head. It has been experimentally indicated that the presence of this silver plating on both sides of the primary coil significantly improves the operation of the electrotherapeutic apparatus.

The electrical connection from the cable 226 to the primary coil 230 is shown in FIGS. 7 and 8 where the wire 290 is connected to portion 292 of the primary coil from the center conductor of the coaxial cable 226 and wire 294 is connected to portion 296 from the grounded shield of the cable. Note the shell 298 of the treatment head is also grounded. It should also be noted that wire 290 is connected to the upperside of portion 292 while wire 294 is connected to the underside of portion 296; however, this particular connection of the wires is not deemed to be critical.

Referring to FIGS. 7—9, the secondary winding or coil 234 will be described. Nonconducting spacers 300—304 separate the primary coil 230 from secondary coil 234 and provide mounting for both of these coils to the shell 298 of the head as can be seen in FIGS. 7 and 8. Typically, a preferred spacing between the primary and secondary coils is 1 inch. Referring to FIG. 9, there is shown a top plan view of the secondary coil. It can be seen that its shape is generally that of a rectangular spiral. A plurality of holes 306 are disposed along the length of the spiral. A typical, preferred hole density is 42 holes per square inch along the length of the spiral, the holes typically being seven sixty-fourths inch diameter. The spacing from the center line of length of the spiral to the next adjacent length of spiral is typically one-half or nine-sixteenths inch. The spacing of the secondary coil from the shell 298 is typically one-fourth to one-half inch; and the thickness of the secondary coil is typically 0.051 to 0.095 inch, it being made of an electrical conductor such as copper and silver plated on both sides thereof or unplated.

As can be seen in FIG. 6, the cover 238 is separated from secondary coil 234 by appropriate spacers 308—318 which are secured to spacers 300—304 as shown in FIG. 9. Typically, the separation of secondary coil 234 from cover 238 is 1 inch. The cover 234 is preferably made of some electrically nonconducting material and its dimensions are typically 4½by 12 inches or 6½by 10½inches.

Although specific dimensions are given for various parts of the treatment head as described hereinbefore, it is to be understood that these dimensions are given for illustrative purposes only and they are not to be considered limitative.

Referring to FIGS. 6—10, the adjustable tuning capacitor 236 of the tank 232 will now be described. The capacitor comprises two plates 324 and 326 which are separated at the bottom thereof by spacers 320 and 322 as shown in FIGS. 6 and 8. Referring to FIG. 10, which is a fragmentary cross-sectional view taken along the line 10–10 of FIG. 8, there is shown a threaded shaft 328, the purpose of which is to provide a capability for adjusting the average distance between the plates 324 and 326 and thereby adjust the capacitance of the tank 232 of FIG. 2B. As can be seen in FIG. 6, knob 284 is attached to the end of shaft 328 to facilitate the rotation thereof. The rotation of shaft 328 causes the flexing of plates 324 and 326 as indicated at 330 and 332 of FIG. 10. This is achieved by providing apertures 334 and 336 in plates 330 and 332 respectively. Aperture 334 may be threaded to receive the threaded portion 338 of shaft 328 or a threaded nut 340, as shown in FIG. 10, may be integrally attached to plate 324 to provide the threaded aperture for threaded portion 338. Also integral with or integrally attached to shaft 328 are portions 342 and 344 which rotate with shaft 328 and maintain shaft 328 fixedly positioned with respect to plate 326 in so far as horizontal movement of shaft 328 is concerned but not rotational movement. Thus, as shaft 328 rotates, the upper portions of plates 324 and 326 are either drawn together or apart depending on the direction of rotation of the shaft even though the plates are maintained a fixed distance apart at their lower portions by spacers 320 and 322, and hence the desired capacitance variation of the tank 232 is obtained.

As shown in FIGS. 7, 8 and 10, there are two wires 346 and 348 which respectively connect plate 324 to outward terminal 350 (see FIG. 10) and plate 326 to inner terminal 352 of FIG. 10. Wire 348 is connected to terminal 354 (see FIG. 8) on plate 326 and it passes through aperture 288 of primary coil 230 to terminal 352 of the secondary coil. Wire 346 is connected to terminal 356 and it passes around the periphery of primary coil 230 to terminal 350 of the secondary coil, as shown in FIG. 7. Appropriate insulation 358 is provided at the point where wire 346 passes primary coil 230. It can now be seen how the secondary tank 232 is constructed.

Figure 15:
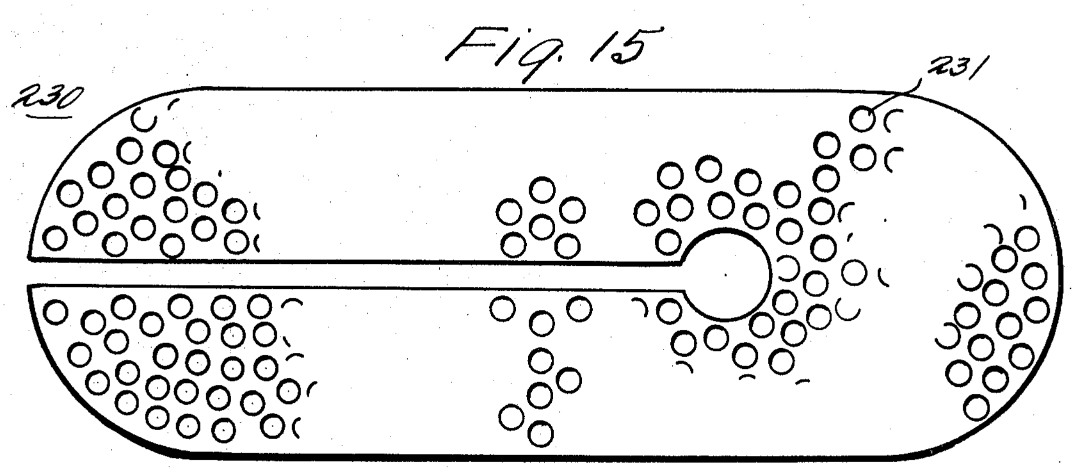
FIG. 15 is a plan view of a modification of the primary coil of the treatment head of FIG. 4.
Figure 16:
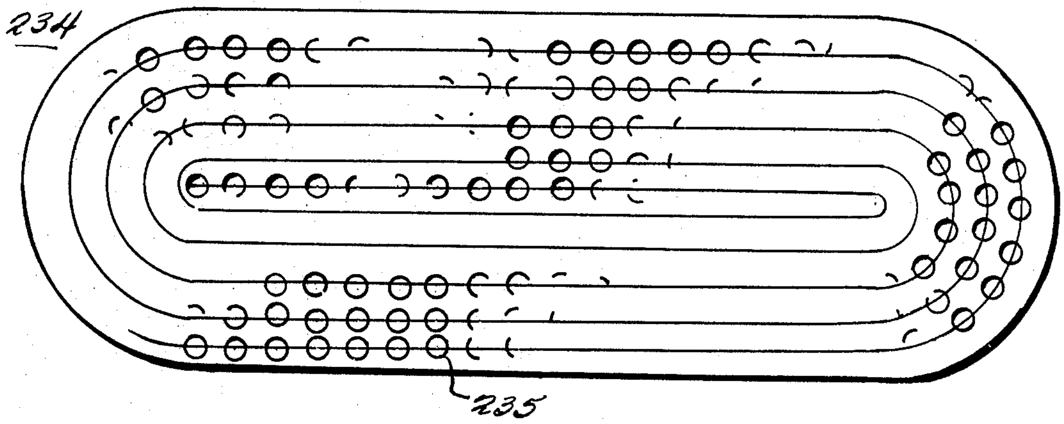
FIG. 16 is a plan view of a modification of the secondary coil of FIG. 9.

Reference should now be made to FIGS. 15 and 16, which illustrate further modifications of the primary and secondary coils, respectively, of the treatment head. In FIG. 15, there is shown a primary coil 230 which corresponds to the primary shown in FIG. 7 except for the apertures or holes 231, which may be provided by punching, drilling or any other suitable means. The arrangement of the holes is arbitrary although they may be arranged in a spiral conforming to the spiral configuration of the secondary of FIG. 9.

In FIG. 16, there is shown a secondary coil 234 which comprises a sheet of electrically conductive material such as metal having a plurality of apertures or holes disposed therein in a manner similar to that of FIG. 15. However, in FIG. 16, the arrangement of the holes is spiral-shaped.

The density and size of the holes of the coils of FIGS. 15 and 16 is arbitrary; for example, the density and size of the holes of the secondary coil of FIG. 9 may be employed. The incorporation of holes or perforations in the secondary coils increases the Q of the tank circuit comprising the coil and its associated capacitor because the AC resistance of the tank is decreased, the decrease resulting from a lowering of the skin effect. Another desirable effect of the decrease in AC resistance is the reduction of heat produced in the coil for a given amount of radio frequency output signal. These desirable effects are also obtained in the various modifications of the secondary coil which are discussed in more detail hereinafter and all of which contain perforations.

Figure 19:
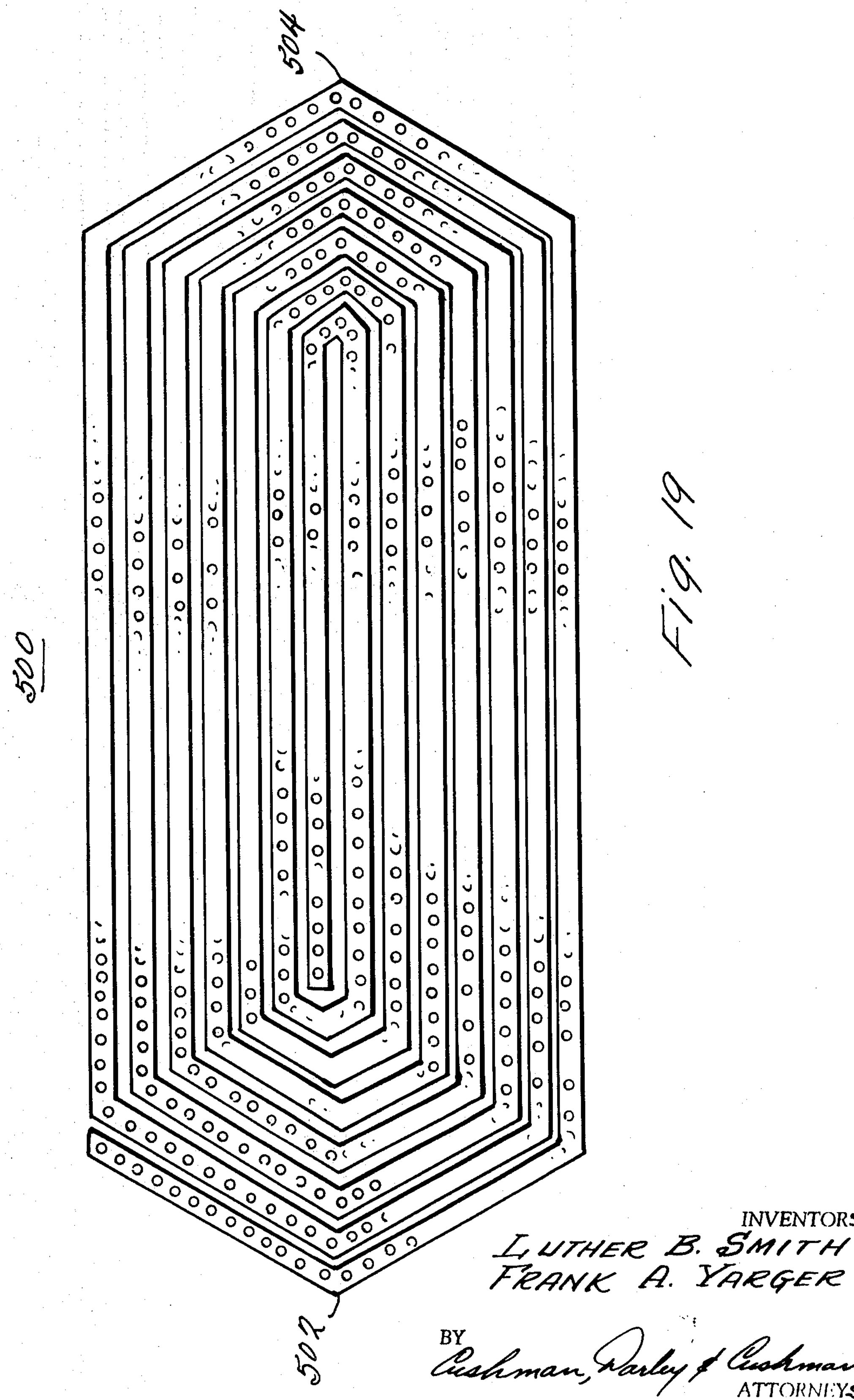
FIGS. 19—21 are plan views of further modifications of secondary coils which may be employed with this invention.

Referring to FIG. 19, there is shown a further modification of the secondary coil generally indicated at 500 which may be used with this invention. The coil has a general configuration which approximates a diamond shape. Thus, each of the rings or conductors of the coil at the end portions 502 and 504 are each pointed outwardly as shown in FIG. 19. This diamond-shaped coil is further distinguishable from the other coils described hereinbefore in only one row of holes is disposed along the length of the individual rings or conductors of the coil. Although the dimensions of the diamond-shaped secondary winding of FIG. 19 may be varied to suit the particular application, preferred dimensions which have been employed in practice are 11 inches length tip to tip by 4⅛ inches width, with a thickness of 0.091 inch and hole diameter of seven sixty-fourths inch. A further tip to tip length employed in practice has been 10⅛ inches.

Figure 20:
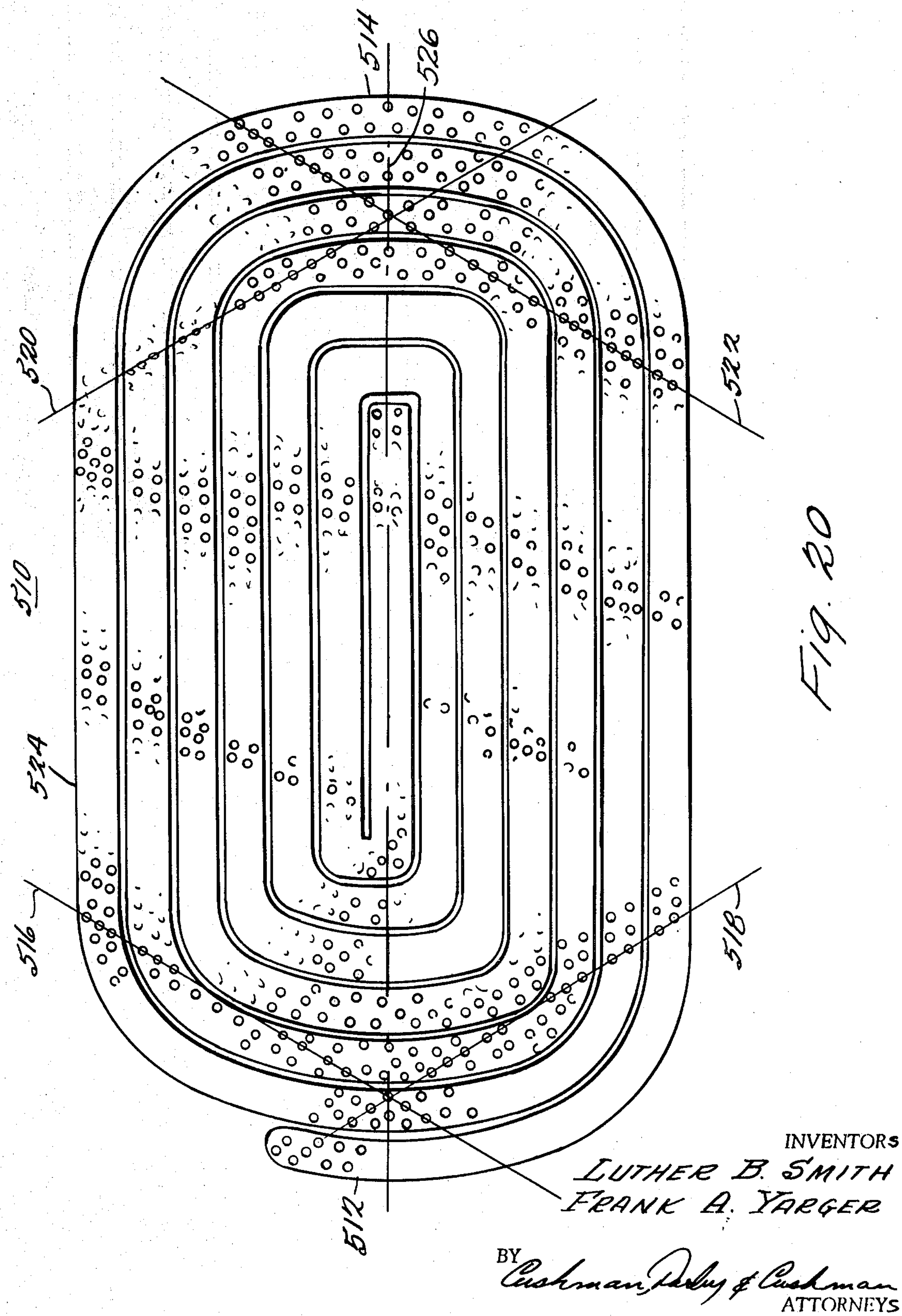

Referring to FIG. 20, there is shown a further modification of the secondary coil generally indicated at 510 which may be used with the invention. This coil has generally rectangular shape with rounded ends 512 and 514. Although provided with rounded ends, the apertures or holes are so arranged on the coil that they assume a diamond-shaped configuration as indicated by the imaginary lines 516—522 extending from the outer ring 524 to an imaginary line 526 bisecting the spiral-shaped conductor lengthwise, the imaginary lines being arranged in pairs (for example, 520 and 522) so as to point outwardly at the end portions 512 and 514, as shown in FIG. 20. Thus, the effect of the diamond-shaped array of FIG. 19 is approximated by the coil of FIG. 20.

Figure 21:
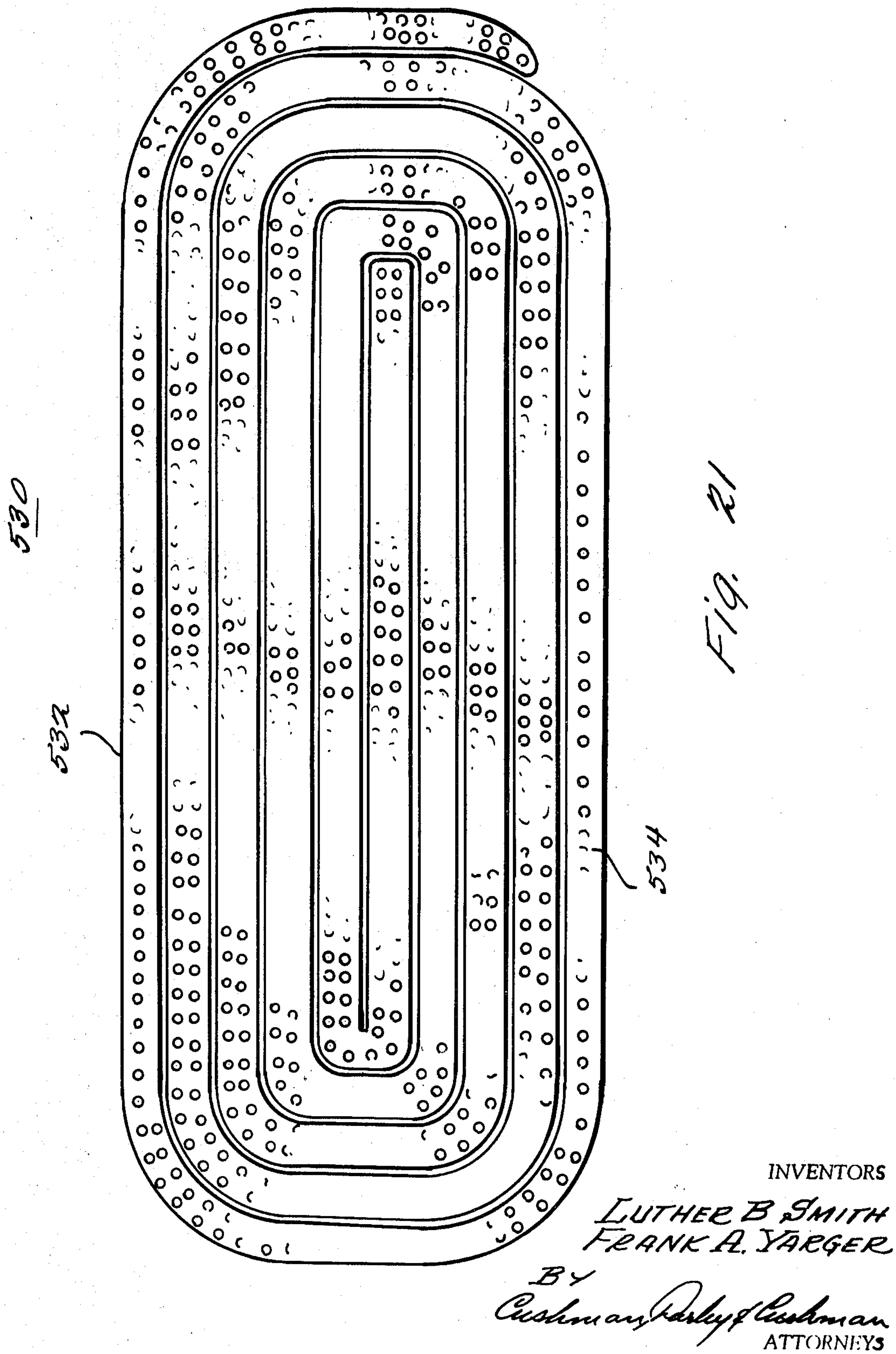

Referring to FIG. 21, there is shown a further modification generally indicated at 530 of the coil of FIG. 20 wherein a single row of holes is provided in the outer conductors 532 and 534 along the lengthwise direction of the coil thereby facilitating the fabrication of the treatment head in some applications.

Note that in other embodiments of the secondary coil, the number of rows of holes per conductor is typically two; however, the number may be greater or less depending on the application. It should be further realized that other embodiments of the primary or secondary windings, such as the apertured sheet embodiment of the secondary winding shown in FIG. 16, may also have their associated apertures or holes arranged in the diamond configuration of FIGS. 19—21.

Having described the structure and operation of a preferred embodiment of the electrotherapeutic apparatus of this invention, a method for tuning this apparatus will now be described. As stated hereinbefore, one of the objects of this invention is to provide a method for tuning the apparatus whereby the tank circuit 28, the coaxial cable 226, the head tank circuit 232, and the patient or patient simulating load, as the case may be, are impedance matched at all times, thereby insuring maximum power transfer to the patient at all times and further insuring optimum effectiveness of the electrotherapeutic apparatus. The method for tuning the apparatus at the manufacturing facility is as follows:

1. A patient simulating load is placed adjacent the treatment head 30 as indicated in FIG. 2B. Artificial load 30 preferably is a solution of calcium and water provided in a substantially airtight, nonconducting container. The procedure for establishing this artificial load will be described in more detail hereinafter.

2. The RF meter 34 is next positioned adjacent the artificial load on the side away from the treatment head as shown in FIG. 2B. The RF meter is connected to a closed loop pickup for measuring RF magnetic current.

3. With the artificial load 32 and the RF meter 34 in position, the apparatus is activated to generate diamond shaped pulses of RF energy. The tank circuit 28 (via capacitors 222 and 224) and the treatment head tank circuit 232 (via capacitor 236) are next adjusted in any manner to obtain indications on both of the meters 34 and 38.

4. The tank 232 only is then adjusted to obtain a minimum current indication on meter 38, which, because of the upside down mounting or reverse operation of this meter, will appear as a "maximum" reading.

5. Capacitors 222 and 224 are then adjusted to obtain a maximum output indication on meter 34.

6. Again the tank 232 is adjusted to obtain a minimum current indication on meter 38.

7. The adjustment of the output tank capacitors 222 and 224 and the head tank capacitor 236 is successively repeated as indicated in steps (4) through (6) until the meter 38 is at minimum current indication and meter 34 is at maximum or, in other words, until the two meters track — that is, any change of the head adjustment will cause an increase in current indication on meter 38 and a decrease of the indication of meter 34.

8. With the completion of steps (1) through (7), the tuning procedure followed at the manufacturing facility is complete. Impedance matching and thus maximum power transfer has been achieved between the output tank 28, the cable 226, the head tank 232, and the artificial load 32.

After shipment of the apparatus to the user, the tuning procedure on a particular patient merely involves the placement of the treatment head adjacent the portion of the body to be treated and the adjustment of head tank via tuning knob 284 until minimum current indication is obtained at meter 38. At this time, optimum power transfer occurs between the treatment head and the patient. When compared to the prior art approach employing an indicator light on the treatment head, it can be seen that the method of the present invention provides improved results. Thus, the above prior art approach does not indicate that an impedance match exists between the output tank 28 and its load. Further, this approach is inherently inaccurate in that the eye is unable to follow small changes of light intensity. However, the eye can readily follow the deflections of meter 38. Thus, the meter 38 together with the use thereof constitutes important improvement with respect to prior art electrotherapeutic apparatus.

Figure 17:
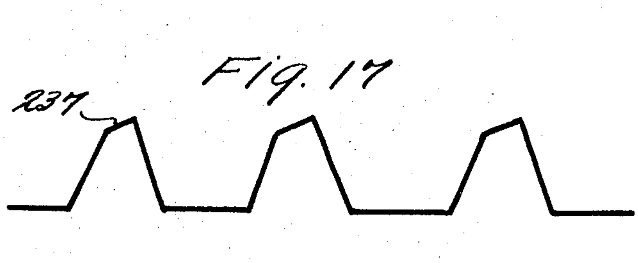
FIGS. 17 and 18 illustrate envelops of waveforms occurring in the embodiment of FIG. 1 for improper and proper tuning of the apparatus, respectively.
Figure 18:
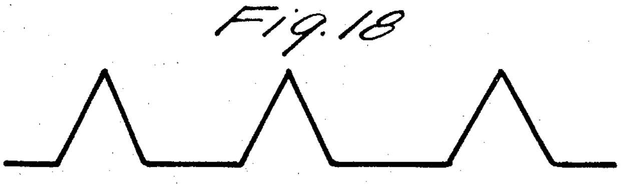

A further advantageous result occurs and this is best illustrated by the waveforms of FIGS. 17 and 18. FIG. 17 illustrates the envelop of the amplitude-modulated radio frequency signal appearing at the output of the tank circuit 28 when the tank circuit is improperly tuned. Note, in particular, the discontinuity 237 in the leading edge of the waveform. FIG. 18 illustrates the output envelop when the tank is properly tuned. It is clear from a comparison of the envelops of FIGS. 17 and 18 that the envelop of FIG. 18 has the sharpest apex and it has been determined that this is of particular importance in electrotherapeutic apparatus. The tuning method described hereinbefore automatically results in the waveform of FIG. 18.

Figure 11:
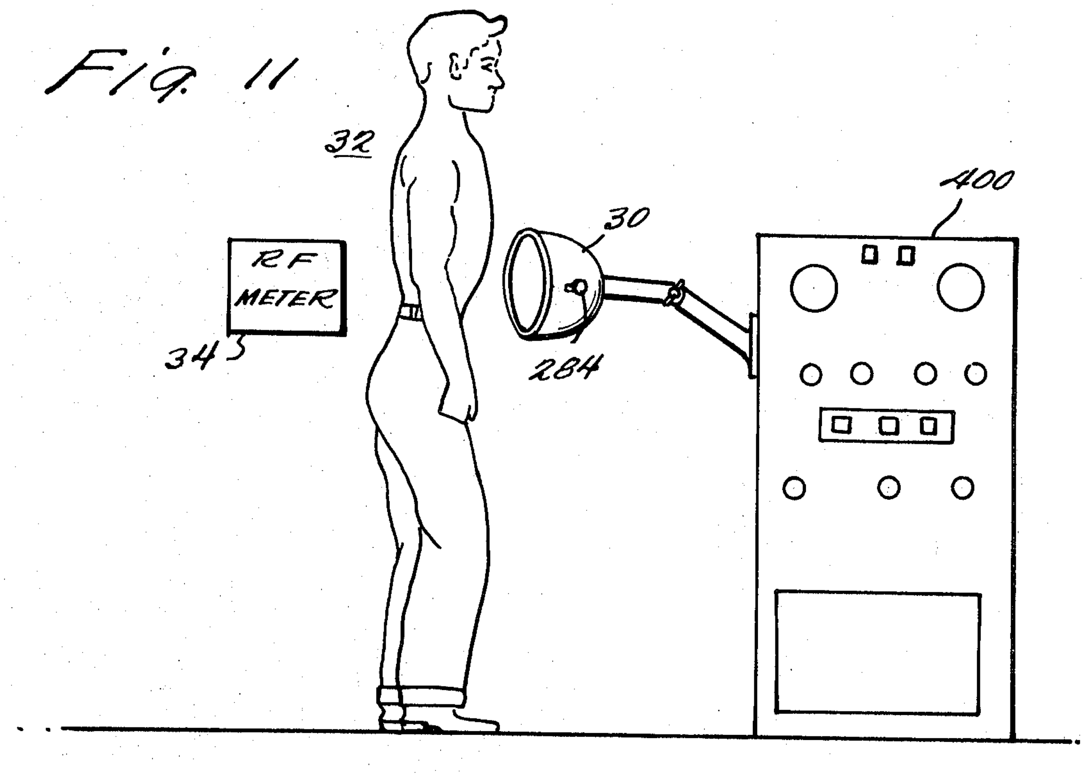
FIGS. 11 and 12 illustrate two parts of a procedure for establishing an artificial, patient-simulating load.
Figure 12:
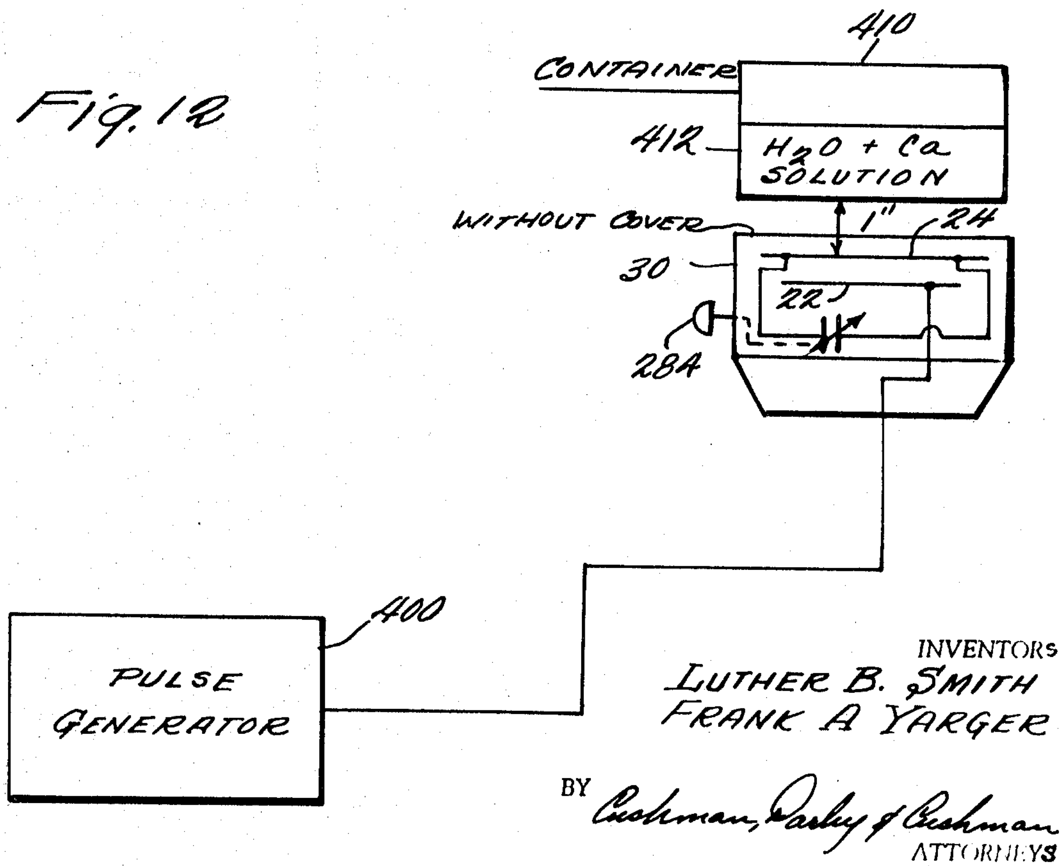

Reference should now be made to FIGS. 11 and 12 which illustrate a method for establishing artificial load 32. Referring to FIG. 11, there is shown an illustrative arrangement for accomplishing the first part of the procedure for establishing the patient simulating load. A patient generally indicated at 30 stands adjacent the cover of treatment head 30, which is connected to diamond pulse generator 400, which encompasses all of the blocks of FIG. 1 except the treatment head 30, the load 32, and the RF meter 34. Note that the head 30 and the meter 34 are placed in the front and back of a reference load such as the patient's abdominal area. Thus, the artificial load to be established will correspond to that area. If the artificial load is to be established for the hand, the head and meter would be placed on opposite sides thereof. The apparatus is then tuned in the manner described hereinbefore, thereby indicating an impedance match with the patient. At this time the readings of meters 34 and 246 are noted. This completes the first part of the procedure for establishing the patient simulating load.

The arrangement for accomplishing the next and last part of the procedure is shown in FIG. 12. Here the cover of the treatment head is removed and a container 410 is placed adjacent thereto. Typically, the bottom of the container is approximately one inch from the secondary coil of the tank as indicated in FIG. 12.

The pulse generator 400 is then turned on and energy is coupled from coil 24 to the bottom portion of container 410, which initially contains a certain amount of calcium and water solution 412. The exact amount of solution is not critical. A general rule of thumb to follow is to place in container 410 enough calcium (preferably pulverized, 200 mesh or smaller) to cover the bottom thereof. Enough water is then added to just cover the calcium. Generally, the initial amount of solution will now simulate the abdominal area as shown in FIG. 11. Thus, the amount of solution is increased until the readings obtained from the first part of the procedure are substantially duplicated. At this time, the solution 412 together with the container 410 does simulate the original abdominal reference area insofar as it presents essentially the same load to treatment head 418.

Having established the artificial load, the electrotherapeutic apparatus may be tuned at the manufacturer's or user's facility as described hereinbefore. Further, the apparatus may be subjected to a longevity test prior to shipment. The longevity test is accomplished by placing the artificial load adjacent the treatment head and energizing the pulse generator for an extended period of time, such as 24 or 36 hours. If no components fail during the longevity test, the apparatus is ready for shipment after it has been re-tuned in accordance with the before-mentioned procedures.

In order to maintain a reasonable impedance match between the treatment head tank circuit and the patient, the artificial load, mentioned hereinbefore, may be used. Thus, this load may be used not only at the manufacturing facility for tuning purposes and longevity tests, but also at the user's facility for maintaining the unit.

Figure 13:
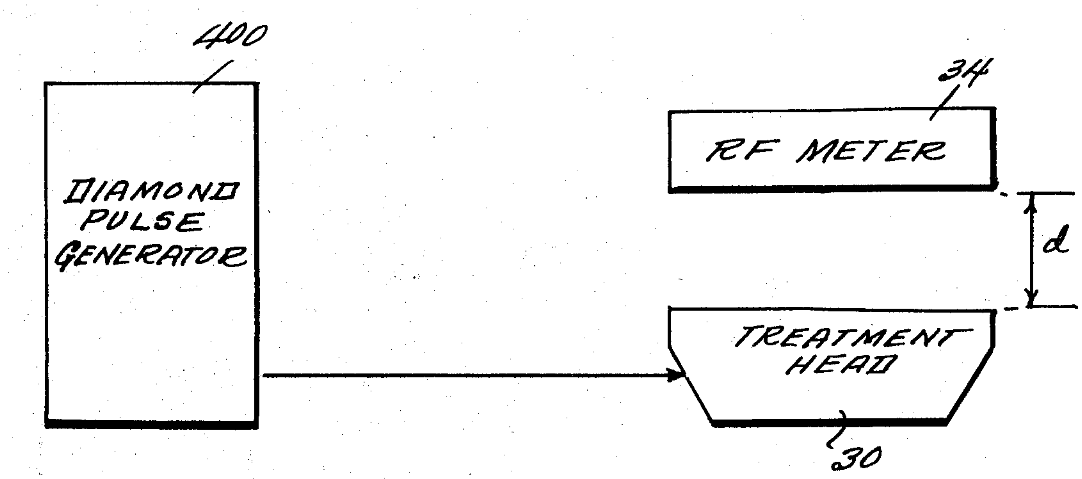
FIGS. 13 and 14 illustrate two parts of a procedure for tuning electrotherapeutic apparatus with an artificial load.

In designing the treatment head, the illustrative arrangement of FIG. 13 is used. This shows the diamond pulse generator 400 connected to treatment head 30 and the meter 32 spaced from head 30 by an amount not less than the height of the artificial load. With the pulse generator and the treatment head tuned for maximum output during this unloaded condition of the treatment head, a reading is taken on the RF meter 34.

Figure 14:
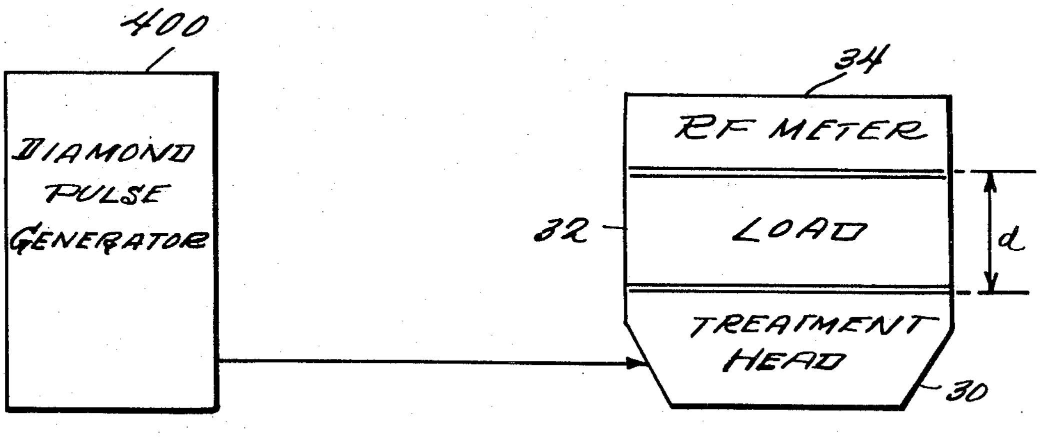

In the next and last step of the procedure as shown in FIG. 14, the artificial load 32 is inserted between the head 30 and the meter 34 while at the same time the distance between the head 30 and the meter 34 is maintained equal to the separation of FIG. 13. The pulse generator is energized. If the treatment head tank circuit is impedance matched to the artificial load, the meter 34 should read 50 percent less than the previous reading obtained for the FIG. 13 arrangement. If the reading is different from 50 percent the dimensions of the secondary coil are changed or the spacing between the primary and secondary coil is changed until a 50 percent reading is obtained. It has been established that a ratio of 30 percent gives too much surface heat on the patient while 70 percent results in decreased efficiency of performance. Thus, a simple procedure has been described for aiding in the design of the treatment head elements.

Thus, there has now been described various embodiments of an electrotherapeutic apparatus including an improved treatment head, pulse generator, and means for establishing the tuned condition thereof. Also described is an artificial load for simulating a patient and a method for establishing the load. Further, a method for using the artificial load both at the manufacturer's and the user's facilities has been described.

Figure 22:
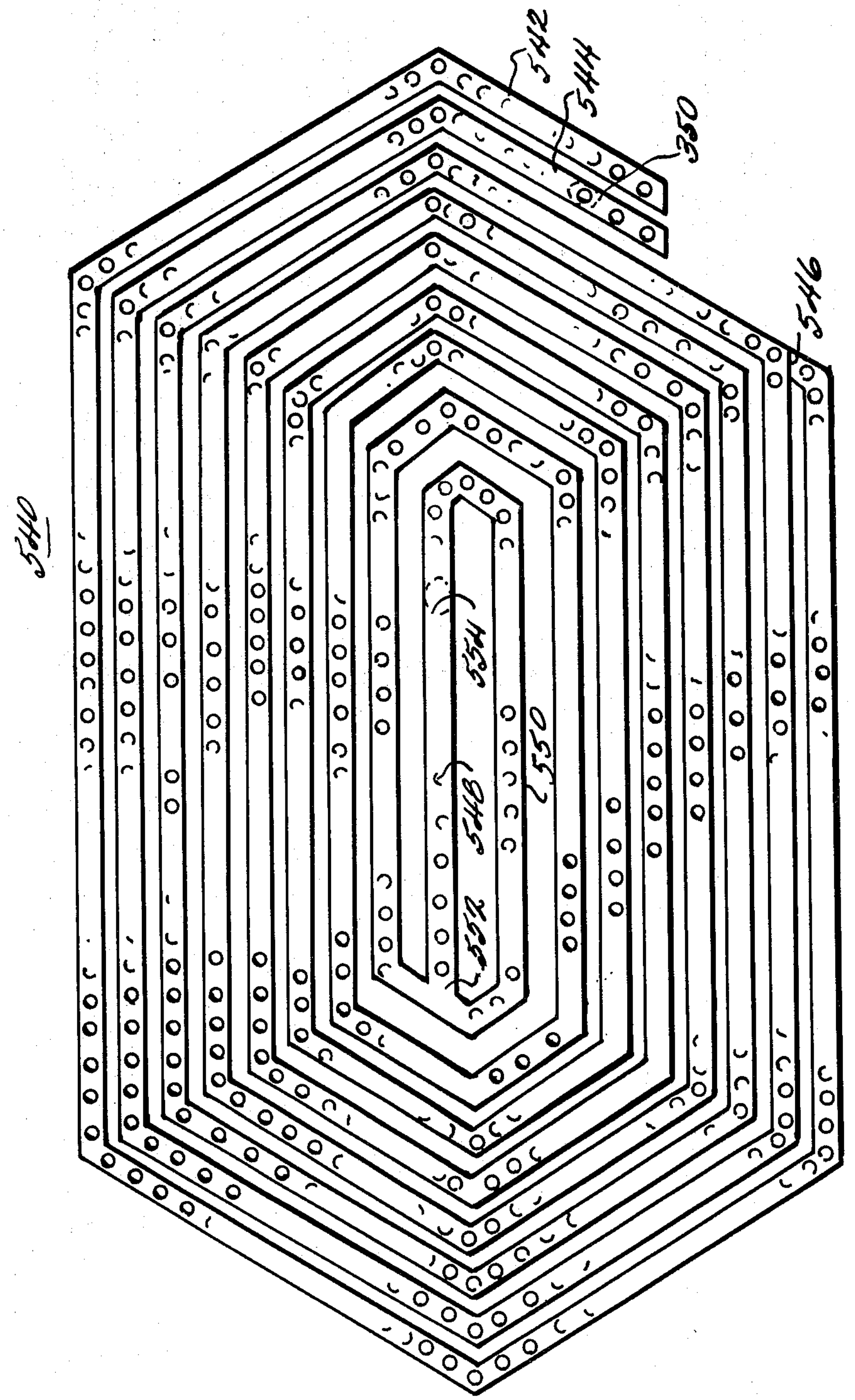
FIGS. 22 and 23 illustrate further, preferred embodiments of the secondary coil of the treatment head.
Figure 23:
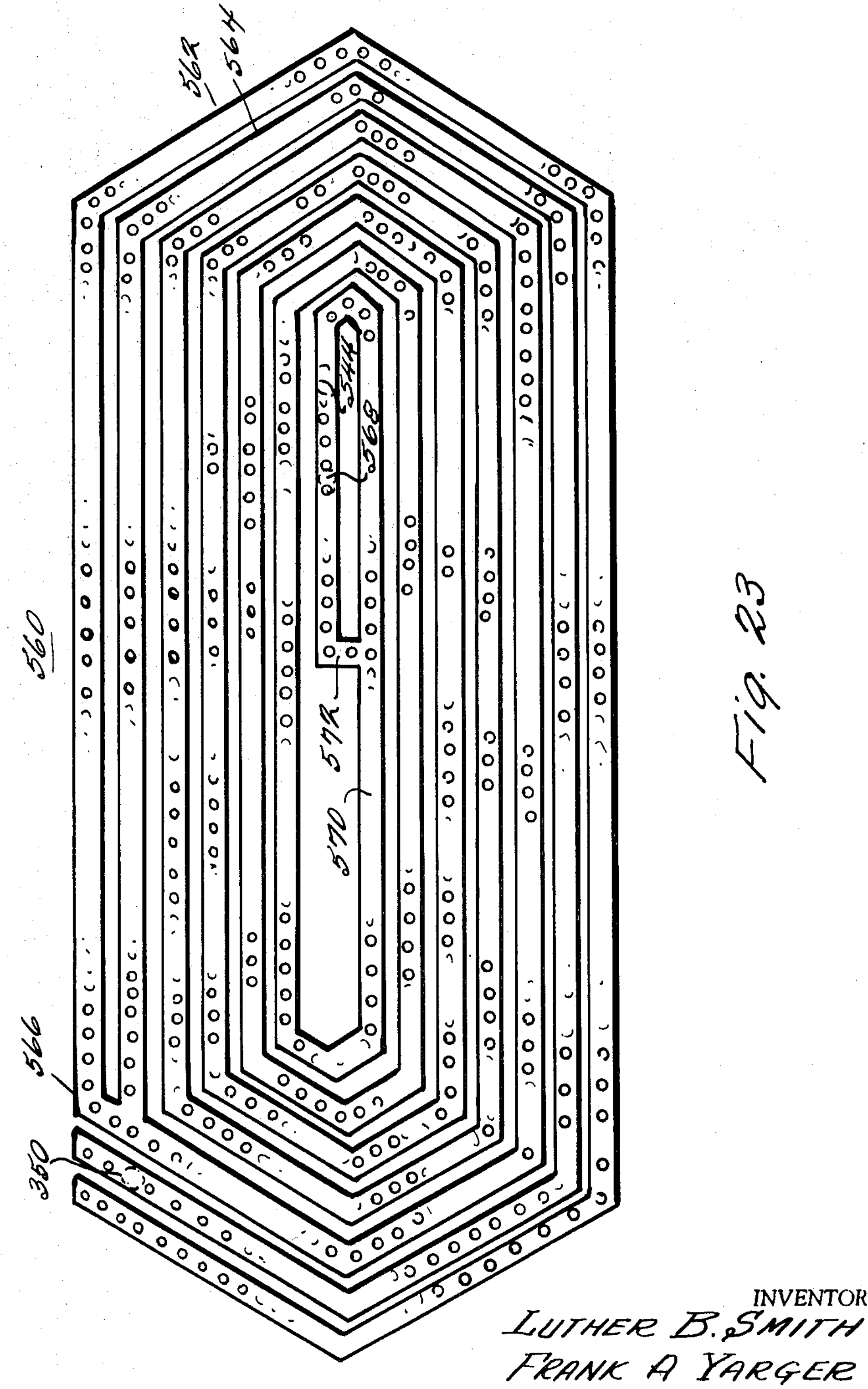

Referring to FIGS. 22 and 23, there are shown further embodiments 540 and 560 respectively of the secondary coil of the treatment head, these embodiments being preferred in the equipment as manufactured. Both of these embodiments are structurally similar, the main difference being the FIG. 22 embodiment is used with treatment heads which are shorter and wider than the treatment heads which employ the FIG. 23 treatment heads. The particular structural features which distinguish the secondary coils of FIGS. 22 and 23 over that of FIG. 19 are as follows. First, note that the electrical connection 350 from the adjustable capacitor is made only to the inner conductor of the two outer conductors 542 and 544 of FIG. 22 and 562 and 564 of FIG. 23. In the embodiments of both of these FIGS. the current distribution across the secondary coil is desirably modified. At point 546 of FIG. 22 and point 566 of FIG. 23, the two outer conductors are electrically connected together only after each of the conductors 542 and 544 and conductors 562 and 564 have completed a substantially complete loop and the remainder of the inner coils are single conductors as in FIG. 19. In other embodiments it may be preferable to also connect the conductors 542 and 544 and the connectors 562 and 564 together at the other respective ends thereof adjacent connection 350.

In FIG. 22, the innermost conductors 548 and 550 form a closed loop with conductor 548 being electrically connected to conductor 550 at point 552. This arrangement further enhances the current distribution across the secondary coil. Point 554 indicates the preferred position of the terminal 352 to which the other conductor from the adjustable capacitor is connected. The inner conductors 568 and 570 of the FIG. 23 embodiment are also connected to form a closed loop where the conductors 568 and 570 respectively correspond to the conductors 548 and 550 of FIG. 22. However, the length of conductor 568 is substantially less than that of conductor 570. This is done so that the length of conductor 568 substantially approximates that of conductor 548. Note that conductor 568 is electrically connected to conductor 570 at point 572 in a manner similar to that shown at point 552 in FIG. 22.

Figures 24, 25, 26:
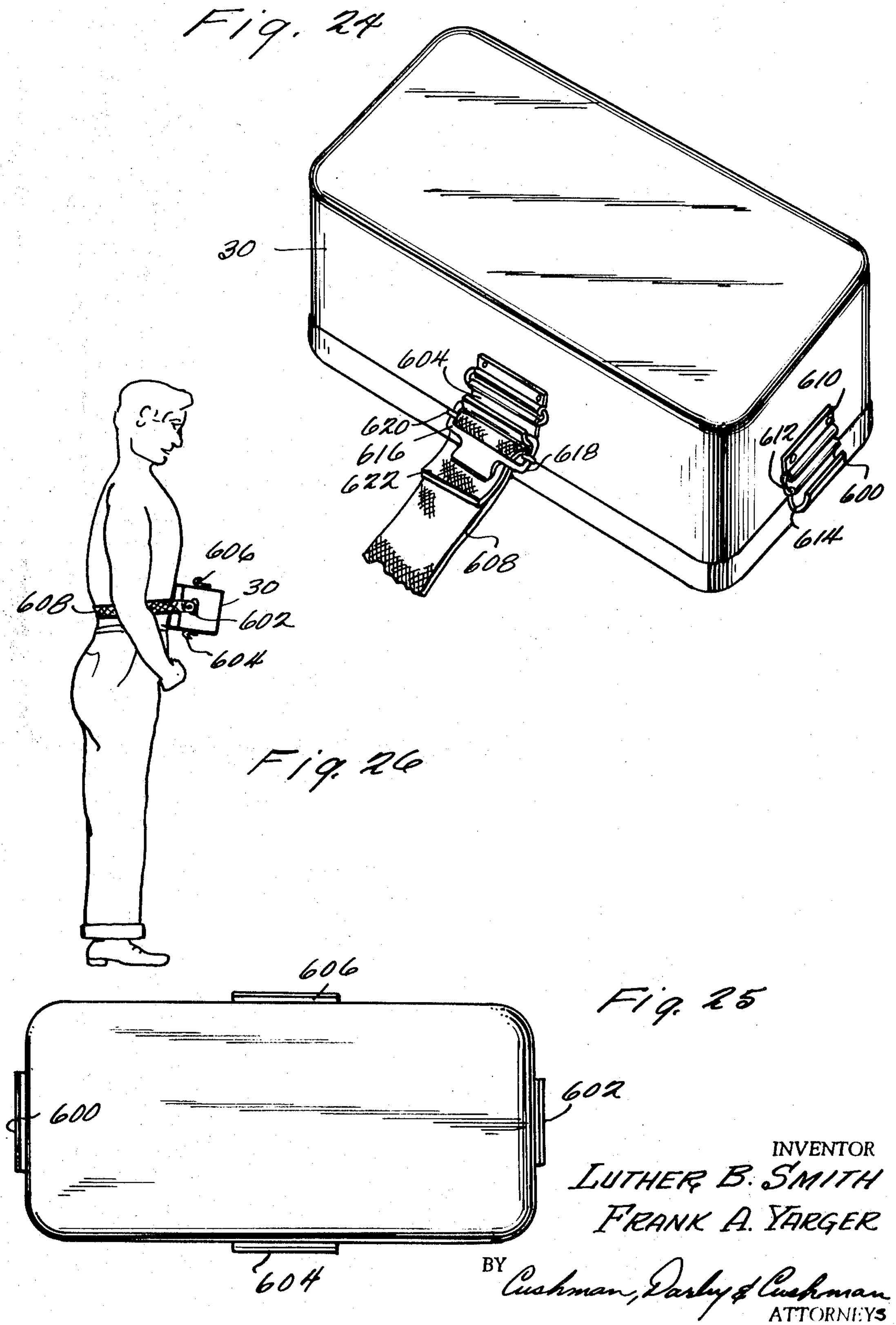
FIG. 24 is a perspective view of a treatment head illustrating a preferred means for attaching the treatment head to a patient's body.
FIG. 25 is a bottom plan view of the treatment head of FIG. 24.
FIG. 26 illustrates how the treatment head of FIG. 24 would be attached to the body.

A further feature of this invention resides in the unique means for attaching the treatment head to the body to thereby maximize the operating efficiency of the apparatus by minimizing the air gap between the treatment head and the patient. Referring to FIG. 24, there is shown a perspective view of a treatment head 30 having connected thereto only the attaching means for purposes of clarity. As diagrammatically indicated in the bottom plan view of the treatment head in FIG. 25, there are two pairs of hooks to which a suitably adjustable strap can be connected. Thus, the first pair of hooks 600 and 602 are used to attach the treatment head lengthwise to an area of the body such as the abdomen as indicated in FIG. 26. Note how the elastic strap 608 is connected to hook 602 and wrapped around the body where it is connected at its other end to hook 600 (not shown in FIG. 26). If it is desired to attach the treatment head widthwise to an area of the body such as the forearm, the hooks 604 and 606 are used. Thus, it can be seen that with the two pairs of hooks, the treatment head is readily attachable to any part of the body requiring treatment.

A further important feature of the treatment head attaching means results from the fact that the length of the strap 608 is adjustable at both ends thereof. Hence, the strap can easily be tightened around any portion of the body.

Referring to FIG. 24, there is shown a perspective view of the treatment head and, in particular, the hooks 600 and 604. These hooks are of conventional construction and, in themselves, do not form a part of the invention. Hook 600 preferably comprises a bracket 610 which is secured to treatment head 30, the bracket having an elongated opening through which passes an elongated ring or connecting link 612, which is rotatably secured within the opening. A hook member 614 also includes an elongated opening through which ring 612 also passes. Thus, hook member 614 is movably positioned with respect to the head 30, The same applies to hook 604. However, the hooks 600—606 may also be fixedly positioned with respect to the treatment head by appropriate means such as rivets. As shown in FIG. 24, strip 608 is connected to hook 604 by a suitable straplength adjusting means 616 of conventional construction, which of itself, does not form a part of this invention. The strap length adjusting means 616 preferably comprises a loop shaped member 618, a first portion of which engages the hook 604. A bar member 620 having opening at both ends thereof is slidably mounted on member 618.

To adjust the length of strap 608, the end portion 622 of the strap is drawn under and around bar member 620 and then under loop member 618 as shown in FIG. 24. When the desired length of strap is obtained, the strap will pull the bar member toward the front of the loop member 618 thereby securely holding the strap in place.

Figure 27:
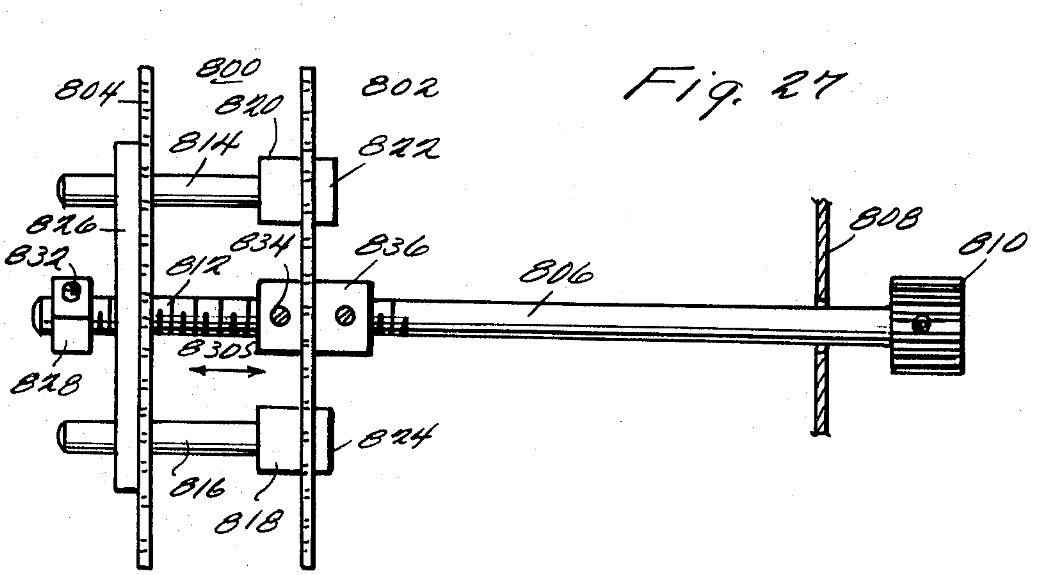
FIGS. 27—29 are top plan, front and side views of a preferred embodiment of a variable tuning capacitor.
Figure 28:
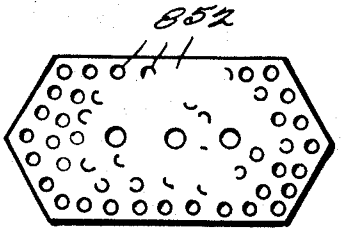
Figure 29:
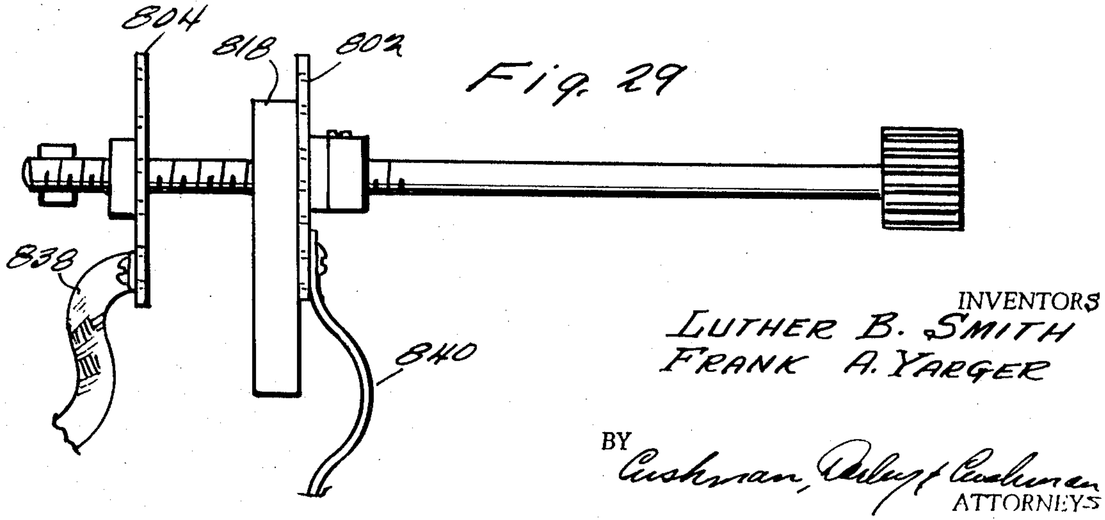

Referring to FIGS. 27, 28 and 29 there is shown respectively a top plan view of an improved, preferred embodiment of the variable tuning capacitor used in the treatment head, the embodiment of FIGS. 27 through 29 being preferred over the embodiment of FIGS. 7 and 8 for reasons which will be discussed hereinafter. Referring to FIG. 27, the capacitor 800 comprises a first plate 802 and a second plate 804. Both plates are mounted upon shaft 806 which extends through the casing of the treatment head 808, a fragmentary portion of which is shown. The shaft is connected to a suitable knob 810. First plate 802 is fixedly positioned along the longitudinal axis of shaft 806 while plate 804 is movable along that axis with respect to plate 802 to thereby provide the required variable capacitance.

As can be seen in FIG. 27 shaft 806 includes a threaded portion 812. Plate 804 has a threaded hole which is threaded onto the threaded portion of shaft 806. Thus, upon rotation of shaft 806 by knob 810, plate 804 is moved along the threaded portion 812. Any tendency of the plate 804 to rotate is eliminated by posts 814 and 816 which are fixedly secured to plate 802. Plate 804 is slidably mounted through holes provided therein on posts 814 and 816 and thus the orientation of plate 804 with respect to plate 802 remains constant for all axial positions of plate 804. As can best be seen in FIG. 29 posts 814 and 816 are respectively secured to plate 802 by members 818 and 820 which also serve as means for mounting the variable capacitor to appropriate anchors such as the underside of the primary plate as indicated in FIG. 8. Members 822 and 824 are also employed to fixedly secure the posts 814 and 816 to plate 802. Crossmember 826 is slidably mounted onto posts 814 and 816, crossmember 826 having a threaded hole which is threaded upon the threaded portion 812 of shaft 806. To limit the travel of plate 804 with respect to plate 802, stops 828 and 830 are mounted upon the threaded portion 812 of shaft 806. Both of these stops may comprise nuts screwed onto the threaded portion 812 and secured by appropriate means 832 and 834, respectively. Member 836 which is also fixedly secured to shaft 806 acts as a means for fixedly positioning plate 802 with respect to shaft 806.

Referring to FIG. 29 the leads from the plates 802 and 804 are respectively shown at 838 and 840. These leads may be either screwed or soldered to the plates. Typically, the lead from stationary plate 802 is connected to the center of the secondary coil, but not necessarily so.

In FIG. 28 it can be clearly seen that the plates 802 and 804 contain a plurality of apertures 850. It has been experimentally indicated that the provision of these apertures improves the performance of the treatment head in some applications.

Figure 30:
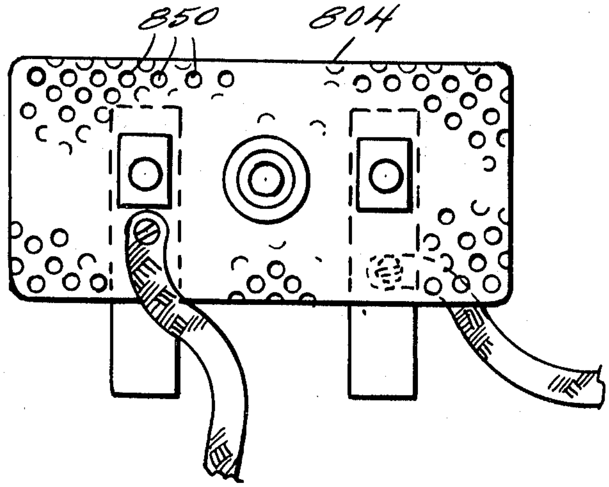
FIG. 30 is a modification of the capacitor plates shown in FIG. 28.

Referring to FIG. 30 there is shown a preferred shape of the plates 802 and 804. This shape is essentially hexagonal or diamond-shaped. The size of the plate shown in FIG. 30 is smaller than that of FIG. 28, however, it is intended to be approximately the same size. The apertures 852 are also arranged in a diamond-shaped configuration as indicated in FIG. 30.

Using the improved variable capacitor of FIGS. 27 through 30, the following advantages are obtained. The shaft 806 is in a permanent position and does not move in and out of the hole in the treatment head as would the shaft 328 of the treatment head of FIGS. 7 and 8. Further, the plates 802 and 804 are always parallel. Because of members 818 and 820 and stop member 830, the plates 802 and 804 can never be short circuited. Also they cannot be opened too wide because of stop member 828. In conclusion, the variable capacitor 800 is more smooth and accurate than the embodiment of FIGS. 7 and 8.

Figure 31:
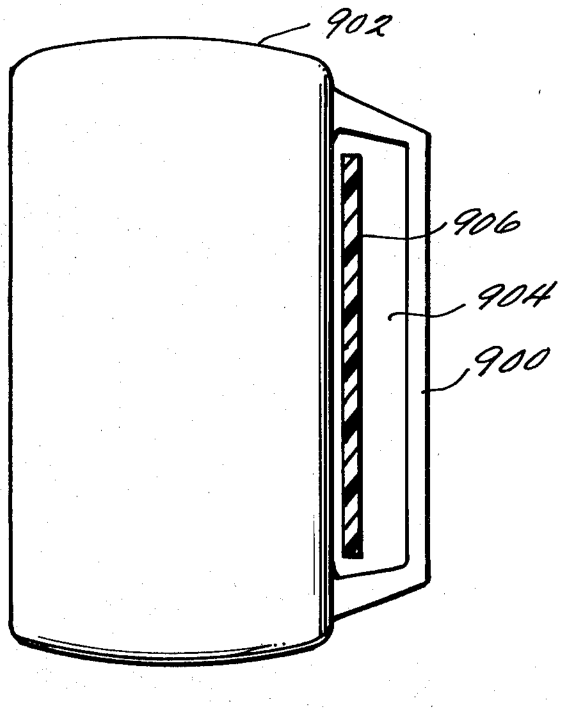
FIG. 31 is a bottom plan view of a treatment head illustrating a modification of the means for attaching the treatment head.

Referring to FIG. 31, there is shown a treatment head incorporating modified means for attaching the head to a portion of the body. This treatment head is preferable to the attachment means shown in FIGS. 24—26 for certain applications. Thus, the attachment means of FIGS. 24—26 is more suitable for larger areas of the body such as the abdomen as indicated in FIG. 26 and for areas of the body such as the head where the relatively narrow strap of FIG. 24 is most suitable. However, when connecting the treatment head to an area of the body such as the thigh, the attachment means of FIG. 31 is more suitable since air pockets tend to form between the head and the treated portion when the attachment means of FIGS. 24—26. As can be seen in FIG. 31, a handle 900, the length of which is typically, at least five inches, is mounted by suitable means on at least one side of the treatment head 902. Drawn through the open portion 904 is a strap or webbing 906, the width of which approximates the length of 904, the webbing being shown in cross section in FIG. 31. Thus, it can be seen that the employment of the long handle 900 permits a wide strap 906 to be passed through the handle and around the treated portion of the body, the wide strap minimizing air pockets between the head and the treated portion.

Figure 32:
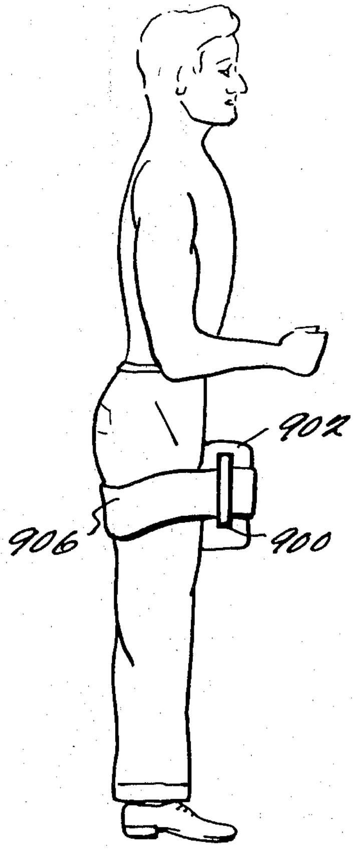
FIG. 32 is a diagrammatic representation illustrating how the attachment means of FIG. 31 connects the treatment head to a portion of the body.

Reference should now be made to FIG. 32 which indicates how the strap 906 secures the treatment head to a portion of the body such as the thigh, a side view of the treatment head being shown. Here it can be seen how the wide strap 906 does indeed minimize any air pockets which might occur between the treatment head and the thigh and thus the efficiency of operation is maximized. Any type of strap 906 is suitable. Preferably the means for securing the strap after it is wrapped around the head and the portion of the body being treated is such that the strap is secured by merely pressing the outer end of the strap to the inner portion of the strap which is wrapped around the treatment head and body portion. Such securing means are well known and used in securing the cuff of blood pressure measuring apparatus around the arm or in belts or in many other applications.

Still further embodiments and modifications of the invention will become apparent to one of ordinary skill in this art upon reading the foregoing disclosure. During such a reading, it will be evident that this invention has provided unique apparatus for accomplishing the objects and advantages herein stated. Still other objects and advantages, and even further modifications will be apparent from this disclosure. It is to be understood, however, that the foregoing disclosure is to be considered exemplary and not limitative, the scope of the invention being defined by the following claims.

We claim:

1. An electrotherapeutic apparatus comprising:
means for generating a signal having a triangular waveform;
means for adjusting the amplitude of said triangular signal;
means for generating a radio frequency signal;
means for modulating said radio frequency signal with said triangular signal to produce diamond-shaped pulses of radio frequency electromagnetic energy;
means for power amplifying said diamond-shaped pulses including tunable output tank circuit means;
treatment head means responsive to the output from said tunable output tank circuit means, said treatment head means including further tunable tank circuit means;
means for detecting whether the tunable output tank circuit is in its resonant state;
multivalued resistor means in circuit with said detecting means; and
means responsive to said means for adjusting the amplitude of said triangular signal for adjusting the value of the said resistor means whenever the amplitude of said triangular signal is adjusted whereby the amplitude of the signal detected by said detecting means remains within a predetermined range of values regardless of the range of values over which the amplitude of the triangular signal is adjusted.

2. Apparatus as in claim 1 where (1) said means for generating said triangular signal includes sawtooth pulse generator means having a plurality of capacitors respectively corresponding to the permissible amplitudes of said triangular signal, (2) said multivalued resistor means includes a plurality of resistors respectively corresponding to said plurality of capacitors where said resistors increase in value as said triangular signals increase in value, and (3) said means for adjusting the value of said resistor means includes switching means having at least a number of poles equal to the total number of said capacitors and said resistors and where each pair of said poles are respectively connected to different ones of said resistors and capacitors.

3. Apparatus as in claim 2 where said tunable output tank circuit means comprises a parallel combination of at least one capacitor and at least one inductor and where said detector means includes a meter for measuring a current indicative of the resonant state of said output tank circuit means, said meter being mounted upside down to give an apparent upscale reading when said resonant state occurs and a downscale reading when a state other than the resonant state occurs.

4. Apparatus as in claim 1 where said treatment head means includes:
a container having a cover, and
said further tunable tank circuit means of said treatment head means being mounted within said container, the inductor of said further tank circuit comprising perforated, electrically conducting material.

5. Apparatus as in claim 4 where said perforations are arranged in a spiral-shaped configuration.

6. Apparatus as in claim 4 where said last-mentioned inductor is a substantially flat sheet of said material disposed substantially parallel to the cover of said container and where said perforations are disposed over the flat surface of said sheet.

7. Apparatus as in claim 6 where said perforations are arranged in a spiral-shaped configuration.

8. Apparatus as in claim 7 where said spiral is substantially rectangular.

9. Apparatus as in claim 4 where said last-mentioned inductor is a flat, spiral-shaped conductor disposed substantially parallel to the cover of said container.

10. Apparatus as in claim 9 where said perforations are disposed along the length of said spiral-shaped conductor.

11. Apparatus as in claim 10 where said spiral-shaped conductor is substantially rectangular.

12. Apparatus as in claim 11 where the perforations of said rectangular spiral-shaped conductor are disposed along imaginary lines extending from the outer ring of said spiral-shaped conductor to an imaginary line bisecting said spiral-shaped conductor lengthwise, said first-mentioned imaginary lines being arranged in pairs so as to point outwardly at the end portions of said spiral-shaped conductor whereby said perforations are arranged in a substantially diamond-shaped configuration on said rectangular spiral-shaped conductor.

13. Apparatus as in claim 12 where only one row of perforations extends along the lengthwise portion of the said outer ring of the spiral-shaped conductor.

14. Apparatus as in claim 11 where the general configuration of said spiral-shaped conductor is substantially diamond-shaped.

15. Apparatus as in claim 14 where only one row of perforations is disposed along the length of spiral-shaped conductor.

16. Apparatus as in claim 4 where the said inductor of said treatment head tank circuit is transformer coupled to the said tunable output tank circuit means, said inductor acting as the secondary winding of the transformer and the primary winding of the transformer comprising a substantially flat sheet of an electrically conducting material.

17. Apparatus as in claim 16 where said sheet is perforated.

18. Apparatus as in claim 17 where said treatment head tank circuit inductor comprises a perforated, substantially flat sheet of an electrically conducting material.

19. Apparatus as in claim 18 where the density and size of the perforations of the primary winding and the secondary inductor are substantially the same.

20. Apparatus as in claim 17 where the arrangement of the perforations of the primary winding and the secondary inductor are substantially the same.

21. Apparatus as in claim 20 where said arrangement is substantially diamond-shaped.

22. Method for tuning an electrotherapeutic apparatus including (1) means for producing pulses of radio frequency electromagnetic energy, (2) power amplifying means for said pulsed energy including tunable tank circuit means, (3) means for detecting whether said power amplifier tank circuit means is in its resonant state, (4) treatment head means being responsive to the power amplified, pulsed energy for radiating said energy to a load, said treatment head means including further tunable tank circuit means, and (5) means for measuring the pulsed electromagnetic energy radiated by said treatment head means through said load; said method comprising the steps of:
a. activating said electrotherapeutic apparatus to thereby produce said pulses of electromagnetic energy;
b. tuning said treatment head tank circuit means to obtain a minimum current indication at said detecting means;
c. tuning said power amplifier tank circuit means until said measuring means indicates that said treatment head is radiating maximum power; and
d. repeating steps (b) and (c) in that order until the detecting means is at minimum current indication and the measuring means is at maximum power indication;
whereby the detecting means and the measuring means will track thereby indicating that said power amplifier tank circuit means, said treatment head means, and said load are impedance matched.

23. The method of establishing an artificial load for electrotherapeutic apparatus including (1) means for producing pulses of electromagnetic energy, (2) power amplifying means for said pulsed energy including tunable tank circuit means, (3) means for detecting whether said power amplifying tank circuit means is in its resonant state, (4) treatment head means being responsive to the amplified, pulsed energy for radiating said energy, said treatment head means including further tunable tank circuit means, and (5) means for measuring the pulsed electromagnetic energy radiated by said treatment head means; said method comprising the steps of:

a. placing a reference load between said treatment head means and said measuring means;
b. activating said electrotherapeutic apparatus to thereby radiate pulses through said reference load to said measuring means;
c. tuning said apparatus so that said power amplifier tank circuit means, said treatment head tank circuit means and said reference load are impedance matched;
d. noting the indications on said detecting and said measuring means;
e. removing said reference load from between said treatment head means and said measuring means;
f. placing a container between said treatment head means and said measuring means;
g. gradually filling said container with a solution of calcium and water until the said indications on said detecting means and said measuring means are substantially 24. An electrotherapeutic apparatus comprising:

1. means for generating pulses of radio frequency, electromagnetic energy;
2. treatment head means responsive to said pulsed energy for radiating the same to a load, said treatment head means including:
   a. a container having a cover, and
   b. tunable tank circuit means being mounted within said container, the inductor of said tank circuit comprising perforated, electrically conducting material and where said inductor is a substantially flat spiral-shaped conductor disposed substantially parallel to the cover of said container and where said perforations are disposed along the length of said spiral-shaped conductor.

25. Apparatus as in claim 24 where said perforations are arranged in a spiral-shaped configuration.

26. Apparatus as in claim 24 where said spiral-shaped conductor is substantially rectangular.

27. Apparatus as in claim 26 where the perforations of said rectangular spiral-shaped conductor are disposed along imaginary lines extending from the outer ring of said spiral-shaped conductor to an imaginary line bisecting said spiral-shaped conductor lengthwise, said first-mentioned imaginary lines being arranged in pairs so as to point outwardly at the end portions of said spiral-shaped conductor whereby said perforations are arranged in a substantially diamond-shaped configuration on said rectangular spiral-shaped conductor.

28. Apparatus as in claim 27 where only one row of perforations extends along the lengthwise portion of the said outer ring of the spiral-shaped conductor.

29. Apparatus as in claim 26 where the general configuration of said spiral-shaped conductor is substantially diamond-shaped.

30. Apparatus as in claim 29 where only one row of perforations is disposed along the length of said spiral-shaped conductor.

31. Apparatus as in claim 24 where the said inductor of said treatment head tank circuit is transformer coupled to the said pulse generating means, said inductor acting as the secondary winding of the transformer and the primary winding of the transformer comprising a substantially flat sheet of an electrically conducting material.

32. Apparatus as in claim 31 where said sheet is perforated.

33. Apparatus as in claim 32 where said treatment head tank circuit inductor comprises a perforated, substantially flat sheet of an electrically conducting material.

34. Apparatus as in claim 33 where the density and size of the perforations of the primary winding and the secondary inductor are substantially the same.

35. Apparatus as in claim 32 where the arrangement of the perforations of the primary winding and the secondary inductor are substantially the same.

36. Apparatus as in claim 35 where said arrangement is substantially diamond-shaped.

37. Apparatus as in claim 24 where the general configuration of said spiral-shaped conductor is diamond-shaped and where the two outer rows of conductors of the spiral are electrically connected together only after each of the said two outer conductors have completed a substantially complete loop to thereby adjust the current distribution across said inductor.

38. Apparatus as in claim 37 where the innermost two legs of the spiral are electrically connected together (1) at one of the ends of the two legs and (2) at the other end of one of the legs and at a point along the length of the other leg.

39. Apparatus as in claim 38 where the point along the length of the other leg is at the other end of said other leg.

40. Apparatus as in claim 39 where said perforations are disposed along the length of the spiral-shaped conductor.

41. Apparatus as in claim 40 where only one row of perforations is disposed along the length of said conductor.

42. Apparatus as in claim 24 including an adjustable strap and where said container has mounted on the ends thereof two hooks between which said adjustable strap may be connected for attaching the treatment head to a body.

43. Apparatus as in claim 42 where said container has a further two hooks mounted on the sides thereof between which the strap may also be connected.

44. Apparatus as in claim 43 where said strap is adjustable at both ends thereof.

45. An apparatus as in claim 24 including a strap and where:

1. means for generating pulses of radio frequency, electromagnetic energy;
2. treatment head means responsive to said pulsed energy for radiating the same to a load, said treatment head means including a container and a tunable tank circuit mounted in said container, said container has mounted on at least one side thereof a handle, the length of which approximates the length of the said one side whereby a strap having a width approximating the length of the inner portion of the handle may be passed through said inner portion for attaching the treatment head to a portion of said load.

46. An electromagnetic apparatus comprising:

1. means for generating pulses of radio frequency, electromagnetic energy;
2. treatment head means responsive to said pulsed energy for radiating the same to a load, said treatment head means including a container and a tunable tank circuit mounted in said container and having a variable capacitor comprising:
   a. a first electrically conductive plate;
   b. a second electrically conductive plate; and
   c. a rotatable shaft having a threaded portion, said shaft being fixedly mounted within said container and projecting through a side thereof whereby inward or outward movement of said shaft with respect to said container is prevented, said first plate being fixedly mounted on said shaft so as to prevent movement thereof along the longitudinal axis of said shaft upon rotation of the shaft and said second plate being mounted on the threaded portion of the shaft so as to permit movement thereof along the longitudinal axis of said shaft upon the said rotation of the shaft whereby the distance between the plates is varied upon rotation of the shaft, the orientation of the plates with respect to one another being parallel for all positions of the variable capacitor.

47. Apparatus as in claim 46 including means for preventing said first and second plates from electrically short-circuiting, said preventing means comprising an electrically insulating member fixedly mounted on said shaft between said plates.

48. Apparatus as in claim 47 including means for limiting the separation between said first and second plates to a predetermined value, said limiting means comprising a member fixedly mounted on said shaft between (1) the end thereof opposite from the end projecting through the container and (2) the second plate.

49. Apparatus as in claim 48 including means for eliminating any tendency of the second plate to rotate upon rotation of the shaft, said eliminating means including at least one post fixedly mounted to said first plate and projecting through a hole in said second plate, said post being substantially parallel to said shaft.